(12) United States Patent
Gruenewald

(10) Patent No.: US 10,592,406 B2
(45) Date of Patent: Mar. 17, 2020

(54) MEMORY ACCESS UNIT AND METHOD INCLUDING GENERATING MEMORY SELECTS TO CONCURRENTLY ACCESS A PLURALITY OF MEMORIES IN A MULTI-DIMENSIONAL ARRAY

(71) Applicant: RENESAS ELECTRONICS EUROPE GMBH, Duesseldorf (DE)

(72) Inventor: Matthias Gruenewald, Duesseldorf (DE)

(73) Assignee: RENESAS ELECTRONICS EUROPE GMBH, Duesseldorf (DE)

(*) Notice: Subject to any disclaimer, the term of this patent is extended or adjusted under 35 U.S.C. 154(b) by 0 days.

(21) Appl. No.: 15/524,098

(22) PCT Filed: Oct. 15, 2015

(86) PCT No.: PCT/EP2015/073870
§ 371 (c)(1),
(2) Date: May 3, 2017

(87) PCT Pub. No.: WO2016/071091
PCT Pub. Date: May 12, 2016

(65) Prior Publication Data
US 2017/0329702 A1    Nov. 16, 2017

(30) Foreign Application Priority Data

Nov. 5, 2014 (EP) .................................. 14191961

(51) Int. Cl.
*G06F 12/02* (2006.01)
*G06F 12/06* (2006.01)
(Continued)

(52) U.S. Cl.
CPC .......... *G06F 12/0207* (2013.01); *G01S 13/28* (2013.01); *G01S 13/5246* (2013.01);
(Continued)

(58) Field of Classification Search
CPC ............. G06F 12/0207; G06F 12/0607; G06F 13/1647; G06F 2212/1016; G01S 13/28;
(Continued)

(56) References Cited

U.S. PATENT DOCUMENTS

| 4,603,348 A | * | 7/1986 | Yamada | ................... | G11C 8/00 |
| | | | | | 358/500 |
| 5,008,852 A | * | 4/1991 | Mizoguchi | .......... | G06F 12/0207 |
| | | | | | 365/220 |

(Continued)

FOREIGN PATENT DOCUMENTS

WO    WO 2009003115 A1 * 12/2008 ......... G06F 12/0207

OTHER PUBLICATIONS

Song, et al., "Synthesis of Custom Interleaved Memory Systems," IEEE Transactions on very large scale integration (VLSI) Systems, IEEE Service Center, vol. 8., No. 1, Feb. 1, 2000, pp. 74-83.

(Continued)

*Primary Examiner* — Glenn Gossage
(74) *Attorney, Agent, or Firm* — Burr & Forman LLP

(57) ABSTRACT

A memory access unit for handling transfers of samples in a d-dimensional array between a one of m data buses, where m≥1, and k*m memories, where k≥2, is disclosed. The memory access unit comprises k address calculators, each address calculator configured to receive a bus address to add a respective offset to generate a sample bus address and to generate, from the sample bus address according to an addressing scheme, a respective address in each of the d dimensions for access along one of the dimensions from the bus address according to an addressing scheme, for accessing a sample. The memory access unit comprises k sample collectors, each sample collector operable to generate a memory select for a one of the k*m memories so as to transfer the sample between a predetermined position in a (Continued)

bus data word and the respective one of the k*m memories. Each sample collector is configured to calculate a respective memory select in dependence upon the address in each of the d dimensions such that each sample collector selects a different one of the k*m memories so as to allow the sample collectors to access k of the k*m memories concurrently. A memory controller may comprise m memory access units for handling transfers of samples in a d-dimensional array between m data buses and k*m memories. An integrated circuit (IC) comprising a memory access unit, and a motor vehicle comprising a computing device having a memory access unit are also disclosed.

18 Claims, 28 Drawing Sheets

(51) Int. Cl.
*G06F 13/16* (2006.01)
*G01S 13/524* (2006.01)
*G01S 13/87* (2006.01)
*G01S 13/28* (2006.01)
*G01S 13/931* (2020.01)
*G01S 13/53* (2006.01)

(52) U.S. Cl.
CPC .......... *G01S 13/87* (2013.01); *G06F 12/0607* (2013.01); *G06F 13/1647* (2013.01); *G01S 13/53* (2013.01); *G01S 13/931* (2013.01); *G06F 2212/1016* (2013.01)

(58) Field of Classification Search
CPC ...... G01S 13/5246; G01S 13/87; G01S 13/53; G01S 13/931
See application file for complete search history.

(56) References Cited

U.S. PATENT DOCUMENTS

| | | | | |
|---|---|---|---|---|
| 5,684,981 | A * | 11/1997 | Jones | G06T 11/001 345/566 |
| 5,765,181 | A * | 6/1998 | Oberlin | G06F 12/0692 711/219 |
| 6,604,166 | B1 * | 8/2003 | Jana | G06F 12/0207 711/157 |
| 2010/0042759 | A1 | 2/2010 | Srinivasan et al. | |
| 2010/0145993 | A1 | 6/2010 | Rakib et al. | |
| 2011/0087821 | A1 | 4/2011 | Seo et al. | |
| 2011/0296078 | A1 | 12/2011 | Khan et al. | |
| 2013/0080739 | A1 * | 3/2013 | Kyo | G06F 9/3887 712/42 |
| 2014/0310496 | A1 * | 10/2014 | Eguro | H04N 13/239 711/168 |

OTHER PUBLICATIONS

Extended Search Report and Written Opinion of priority EP application No. 14191961.3 dated May 15, 2015, 13 pages.
International Search Report and Written Opinion of corresponding International Application No. PCT/EP2015/073870 dated Dec. 1, 2015, 8 pages.

* cited by examiner

Accessing along the x-direction

| A_B | D_B | | | |
|---|---|---|---|---|
| 0  | (0,3) | (0,2) | (0,1) | (0,0) |
| 16 | (1,3) | (1,2) | (1,1) | (1,0) |
| 32 | (2,3) | (2,2) | (2,1) | (2,0) |
| 48 | (3,3) | (3,2) | (3,1) | (3,0) |

Fig. 4

Accessing along the y-direction

| A_B | D_B | | | |
|---|---|---|---|---|
| 0  | | | | (0,0) |
| 16 | | | | (1,0) |
| 32 | | | | (2,0) |
| 48 | | | | (3,0) |
| 4  | | | | (0,1) |
| 20 | | | | (1,1) |
| 36 | | | | (2,1) |
| 52 | | | | (3,1) |
| 8  | | | | (0,2) |
| 24 | | | | (1,2) |
| 40 | | | | (2,2) |
| 56 | | | | (3,2) |
| 12 | | | | (0,3) |
| 28 | | | | (1,3) |
| 44 | | | | (2,3) |
| 60 | | | | (3,3) |

Capacity cannot be used

Fig. 5

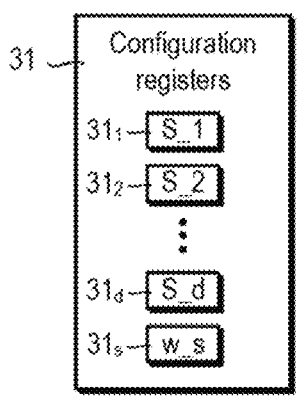
Fig. 6B
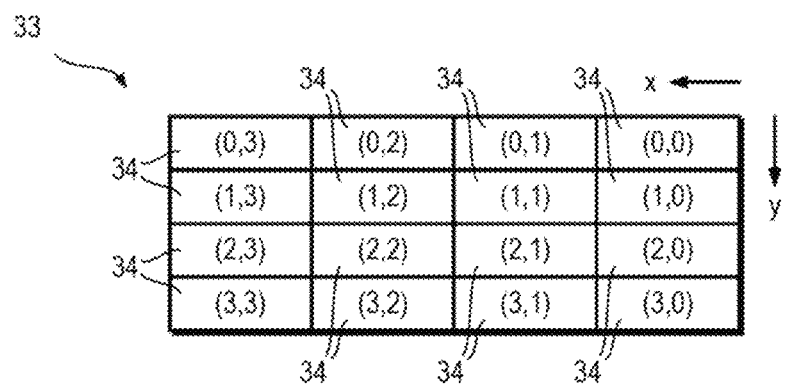
Fig. 7
Accessing along the x-direction
| DIM | A_L | D_B | | | |
|---|---|---|---|---|---|
| 0 | 0 | (0,3) | (0,2) | (0,1) | (0,0) |
| 0 | 16 | (1,3) | (1,2) | (1,1) | (1,0) |
| 0 | 32 | (2,3) | (2,2) | (2,1) | (2,0) |
| 0 | 48 | (3,3) | (3,2) | (3,1) | (3,0) |
Fig. 8
Accessing along the y-direction
| DIM | A_L | D_B | | | |
|---|---|---|---|---|---|
| 1 | 0 | (3,0) | (2,0) | (1,0) | (0,0) |
| 1 | 16 | (3,1) | (2,1) | (1,1) | (0,1) |
| 1 | 32 | (3,2) | (2,2) | (1,2) | (0,2) |
| 1 | 48 | (3,3) | (2,3) | (1,3) | (0,3) |
Fig. 9

| | |
|---|---|
| k | 4 |
| d | 3 |
| w_m | 4 |
| w_s | 4 |
| S_1 | 4 | Range
| S_2 | 5 | Pulse
| S_3 | 2 | Channel

61

Global assignment of addresses and chip selects

62

| A_3 | A_2 | A_1 | A_S | I_S | A_P | CS | A_M |
|---|---|---|---|---|---|---|---|
| 0 | 0 | 0 | 0 | 0 | 0 | 0 | 0 |
| 0 | 0 | 1 | 1 | 0 | 1 | 1 | 0 |
| 0 | 0 | 2 | 2 | 0 | 2 | 2 | 0 |
| 0 | 0 | 3 | 3 | 0 | 3 | 3 | 0 |
| 0 | 1 | 0 | 4 | 0 | 4 | 1 | 1 |
| 0 | 1 | 1 | 5 | 0 | 5 | 2 | 1 |
| 0 | 1 | 2 | 6 | 0 | 6 | 3 | 1 |
| 0 | 1 | 3 | 7 | 0 | 7 | 0 | 1 |
| 0 | 2 | 0 | 8 | 0 | 8 | 2 | 2 |
| 0 | 2 | 1 | 9 | 0 | 9 | 3 | 2 |
| 0 | 2 | 2 | 10 | 0 | 10 | 0 | 2 |
| 0 | 2 | 3 | 11 | 0 | 11 | 1 | 2 |
| 0 | 3 | 0 | 12 | 0 | 12 | 2 | 3 |
| 0 | 3 | 1 | 13 | 0 | 13 | 0 | 3 |
| 0 | 3 | 2 | 14 | 0 | 14 | 1 | 3 |
| 0 | 3 | 3 | 15 | 0 | 15 | 2 | 3 |
| 0 | 4 | 0 | 16 | 0 | 16 | 0 | 4 |
| 0 | 4 | 1 | 17 | 0 | 17 | 1 | 4 |
| 0 | 4 | 2 | 18 | 0 | 18 | 2 | 4 |
| 0 | 4 | 3 | 19 | 0 | 19 | 3 | 4 |
| 1 | 0 | 0 | 20 | 0 | 20 | 1 | 5 |
| 1 | 0 | 1 | 21 | 0 | 21 | 2 | 5 |
| 1 | 0 | 2 | 22 | 0 | 22 | 3 | 5 |
| 1 | 0 | 3 | 23 | 0 | 23 | 0 | 5 |
| 1 | 1 | 0 | 24 | 0 | 24 | 2 | 6 |
| 1 | 1 | 1 | 25 | 0 | 25 | 3 | 6 |
| 1 | 1 | 2 | 26 | 0 | 26 | 0 | 6 |
| 1 | 1 | 3 | 27 | 0 | 27 | 1 | 6 |
| 1 | 2 | 0 | 28 | 0 | 28 | 3 | 7 |
| 1 | 2 | 1 | 29 | 0 | 29 | 0 | 7 |
| 1 | 2 | 2 | 30 | 0 | 30 | 1 | 7 |
| 1 | 2 | 3 | 31 | 0 | 31 | 2 | 7 |
| 1 | 3 | 0 | 32 | 0 | 32 | 0 | 8 |
| 1 | 3 | 1 | 33 | 0 | 33 | 1 | 8 |
| 1 | 3 | 2 | 34 | 0 | 34 | 2 | 8 |
| 1 | 3 | 3 | 35 | 0 | 35 | 3 | 8 |
| 1 | 4 | 0 | 36 | 0 | 36 | 1 | 9 |
| 1 | 4 | 1 | 37 | 0 | 37 | 2 | 9 |
| 1 | 4 | 2 | 38 | 0 | 38 | 3 | 9 |
| 1 | 4 | 3 | 39 | 0 | 39 | 0 | 9 |

Fig. 13A

| Sample storage 22₄ | | Sample storage 22₃ | | Sample storage 22₂ | | Sample storage 22₁ | |
|---|---|---|---|---|---|---|---|
| A_M(4) | D_M(4) | A_M(3) | D_M(3) | A_M(2) | D_M(2) | A_M(1) | D_M(1) |
| 0 | (0,0,3) [0] | 0 | (0,0,2) [0] | 0 | (0,0,1) [0] | 0 | (0,0,0) [0] |
| 1 | (0,1,2) [0] | 1 | (0,1,1) [0] | 1 | (0,1,0) [0] | 1 | (0,1,3) [0] |
| 2 | (0,2,1) [0] | 2 | (0,2,0) [0] | 2 | (0,2,3) [0] | 2 | (0,2,2) [0] |
| 3 | (0,3,0) [0] | 3 | (0,3,3) [0] | 3 | (0,3,2) [0] | 3 | (0,3,1) [0] |
| 4 | (0,4,3) [0] | 4 | (0,4,2) [0] | 4 | (0,4,1) [0] | 4 | (0,4,0) [0] |
| 5 | (1,0,2) [0] | 5 | (1,0,1) [0] | 5 | (1,0,0) [0] | 5 | (1,0,3) [0] |
| 6 | (1,1,1) [0] | 6 | (1,1,0) [0] | 6 | (1,1,3) [0] | 6 | (1,1,2) [0] |
| 7 | (1,2,0) [0] | 7 | (1,2,3) [0] | 7 | (1,2,2) [0] | 7 | (1,2,1) [0] |
| 8 | (1,3,3) [0] | 8 | (1,3,2) [0] | 8 | (1,3,1) [0] | 8 | (1,3,0) [0] |
| 9 | (1,4,2) [0] | 9 | (1,4,1) [0] | 9 | (1,4,0) [0] | 9 | (1,4,3) [0] |

Fig. 13B

Accesses along dimension 1 (range)

No wait states (because only one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 0 | 0 | 3 | 3 | 0 | 3 | 3 | 0 |
| 28 | 0 | 1 | 3 | 7 | 0 | 7 | 0 | 1 |
| 44 | 0 | 2 | 3 | 11 | 0 | 11 | 1 | 2 |
| 60 | 0 | 3 | 3 | 15 | 0 | 15 | 2 | 3 |
| 76 | 0 | 4 | 3 | 19 | 0 | 19 | 3 | 4 |
| 92 | 1 | 0 | 3 | 23 | 0 | 23 | 0 | 5 |
| 108 | 1 | 1 | 3 | 27 | 0 | 27 | 1 | 6 |
| 124 | 1 | 2 | 3 | 31 | 0 | 31 | 2 | 7 |
| 140 | 1 | 3 | 3 | 35 | 0 | 35 | 3 | 8 |
| 156 | 1 | 4 | 3 | 39 | 0 | 39 | 0 | 9 |

Sample collector $29_4$

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 0 | 0 | 2 | 2 | 0 | 2 | 2 | 0 |
| 24 | 0 | 1 | 2 | 6 | 0 | 6 | 3 | 1 |
| 40 | 0 | 2 | 2 | 10 | 0 | 10 | 0 | 2 |
| 56 | 0 | 3 | 2 | 14 | 0 | 14 | 1 | 3 |
| 72 | 0 | 4 | 2 | 18 | 0 | 18 | 2 | 4 |
| 88 | 1 | 0 | 2 | 22 | 0 | 22 | 3 | 5 |
| 104 | 1 | 1 | 2 | 26 | 0 | 26 | 0 | 6 |
| 120 | 1 | 2 | 2 | 30 | 0 | 30 | 1 | 7 |
| 136 | 1 | 3 | 2 | 34 | 0 | 34 | 2 | 8 |
| 152 | 1 | 4 | 2 | 38 | 0 | 38 | 3 | 9 |

Sample collector $29_3$

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 0 | 0 | 1 | 1 | 0 | 1 | 1 | 0 |
| 20 | 0 | 1 | 1 | 5 | 0 | 5 | 2 | 1 |
| 36 | 0 | 2 | 1 | 9 | 0 | 9 | 3 | 2 |
| 52 | 0 | 3 | 1 | 13 | 0 | 13 | 0 | 3 |
| 68 | 0 | 4 | 1 | 17 | 0 | 17 | 1 | 4 |
| 84 | 1 | 0 | 1 | 21 | 0 | 21 | 2 | 5 |
| 100 | 1 | 1 | 1 | 25 | 0 | 25 | 3 | 6 |
| 116 | 1 | 2 | 1 | 29 | 0 | 29 | 0 | 7 |
| 132 | 1 | 3 | 1 | 33 | 0 | 33 | 1 | 8 |
| 148 | 1 | 4 | 1 | 37 | 0 | 37 | 2 | 9 |

Sample collector $29_2$

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 1 | 0 | 4 | 0 | 4 | 1 | 1 |
| 32 | 0 | 2 | 0 | 8 | 0 | 8 | 2 | 2 |
| 48 | 0 | 3 | 0 | 12 | 0 | 12 | 3 | 3 |
| 64 | 0 | 4 | 0 | 16 | 0 | 16 | 0 | 4 |
| 80 | 1 | 0 | 0 | 20 | 0 | 20 | 1 | 5 |
| 96 | 1 | 1 | 0 | 24 | 0 | 24 | 2 | 6 |
| 112 | 1 | 2 | 0 | 28 | 0 | 28 | 3 | 7 |
| 128 | 1 | 3 | 0 | 32 | 0 | 32 | 0 | 8 |
| 144 | 1 | 4 | 0 | 36 | 0 | 36 | 1 | 9 |

Sample collector $29_1$

Fig. 13C

Accesses along dimension 2 (pulse)

No wait states (even though more than one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 0 | 3 | 0 | 12 | 0 | 12 | 3 | 3 |
| 28 | 0 | 2 | 1 | 9 | 0 | 9 | 3 | 2 |
| 44 | 0 | 1 | 2 | 6 | 0 | 6 | 3 | 1 |
| 60 | 0 | 0 | 3 | 3 | 0 | 3 | 3 | 0 |
| 76 | 0 | 4 | 3 | 19 | 0 | 19 | 3 | 4 |
| 92 | 1 | 3 | 0 | 32 | 0 | 32 | 0 | 8 |
| 108 | 1 | 2 | 1 | 29 | 0 | 29 | 0 | 6 |
| 124 | 1 | 1 | 2 | 36 | 0 | 36 | 0 | 6 |
| 140 | 1 | 0 | 3 | 23 | 0 | 23 | 0 | 5 |
| 156 | 1 | 4 | 3 | 39 | 0 | 39 | 0 | 9 |

Sample collector $29_4$

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 0 | 2 | 0 | 8 | 0 | 8 | 2 | 2 |
| 24 | 0 | 1 | 1 | 5 | 0 | 5 | 2 | 1 |
| 40 | 0 | 0 | 2 | 2 | 0 | 2 | 2 | 0 |
| 56 | 0 | 4 | 2 | 18 | 0 | 18 | 2 | 4 |
| 72 | 0 | 3 | 3 | 15 | 0 | 15 | 2 | 3 |
| 88 | 1 | 2 | 0 | 38 | 0 | 38 | 3 | 7 |
| 104 | 1 | 1 | 1 | 25 | 0 | 25 | 3 | 6 |
| 120 | 1 | 0 | 2 | 22 | 0 | 22 | 3 | 5 |
| 136 | 1 | 4 | 2 | 38 | 0 | 38 | 3 | 9 |
| 152 | 1 | 3 | 3 | 35 | 0 | 35 | 3 | 8 |

Sample collector $29_3$

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 0 | 1 | 0 | 4 | 0 | 4 | 1 | 1 |
| 20 | 0 | 0 | 1 | 1 | 0 | 1 | 1 | 0 |
| 36 | 0 | 4 | 1 | 17 | 0 | 17 | 1 | 4 |
| 52 | 0 | 3 | 2 | 14 | 0 | 14 | 1 | 3 |
| 68 | 0 | 2 | 3 | 11 | 0 | 11 | 1 | 2 |
| 84 | 1 | 1 | 0 | 24 | 0 | 24 | 2 | 6 |
| 100 | 1 | 0 | 4 | 21 | 0 | 21 | 2 | 5 |
| 116 | 1 | 4 | 3 | 37 | 0 | 37 | 2 | 9 |
| 132 | 1 | 3 | 2 | 34 | 0 | 34 | 2 | 8 |
| 148 | 1 | 2 | 3 | 31 | 0 | 31 | 2 | 7 |

Sample collector $29_2$

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 4 | 0 | 16 | 0 | 16 | 0 | 4 |
| 32 | 0 | 3 | 1 | 13 | 0 | 13 | 0 | 3 |
| 48 | 0 | 2 | 2 | 10 | 0 | 10 | 0 | 2 |
| 64 | 0 | 1 | 3 | 7 | 0 | 7 | 0 | 1 |
| 80 | 1 | 0 | 0 | 20 | 0 | 20 | 1 | 5 |
| 96 | 1 | 4 | 0 | 36 | 0 | 36 | 1 | 9 |
| 112 | 1 | 3 | 1 | 33 | 0 | 33 | 1 | 8 |
| 128 | 1 | 2 | 2 | 30 | 0 | 30 | 1 | 7 |
| 144 | 1 | 1 | 3 | 27 | 0 | 27 | 1 | 6 |

Sample collector $29_1$

Fig. 13D

Accesses along dimension 3 (channel)

One wait state required (because more than one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 1 | 0 | 1 | 21 | 0 | 21 | 2 | 5 |
| 28 | 1 | 0 | 3 | 23 | 0 | 23 | 0 | 5 |
| 44 | 1 | 1 | 1 | 25 | 0 | 25 | 3 | 6 |
| 60 | 1 | 1 | 3 | 27 | 0 | 27 | 1 | 6 |
| 76 | 1 | 2 | 1 | 29 | 0 | 29 | 0 | 7 |
| 92 | 1 | 2 | 3 | 31 | 0 | 31 | 2 | 7 |
| 108 | 1 | 3 | 1 | 33 | 0 | 33 | 1 | 8 |
| 124 | 1 | 3 | 3 | 35 | 0 | 35 | 3 | 8 |
| 140 | 1 | 4 | 1 | 37 | 0 | 37 | 2 | 9 |
| 156 | 1 | 4 | 3 | 39 | 0 | 39 | 0 | 9 |

Sample collector 29₄

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 0 | 0 | 1 | 1 | 0 | 1 | 1 | 0 |
| 24 | 0 | 0 | 3 | 3 | 0 | 3 | 3 | 0 |
| 40 | 0 | 1 | 1 | 5 | 0 | 5 | 2 | 1 |
| 56 | 0 | 1 | 3 | 7 | 0 | 7 | 0 | 1 |
| 72 | 0 | 2 | 1 | 9 | 0 | 9 | 3 | 2 |
| 88 | 0 | 2 | 3 | 11 | 0 | 11 | 1 | 2 |
| 104 | 0 | 3 | 1 | 13 | 0 | 13 | 0 | 3 |
| 120 | 0 | 3 | 3 | 15 | 0 | 15 | 2 | 3 |
| 136 | 0 | 4 | 1 | 17 | 0 | 17 | 1 | 4 |
| 152 | 0 | 4 | 3 | 19 | 0 | 19 | 3 | 4 |

Sample collector 29₃

The same CS is generated because both A_1 and A_3 change.

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 1 | 0 | 0 | 20 | 0 | 20 | 1 | 5 |
| 20 | 1 | 0 | 2 | 22 | 0 | 22 | 3 | 5 |
| 36 | 1 | 1 | 0 | 24 | 0 | 24 | 2 | 6 |
| 52 | 1 | 1 | 2 | 26 | 0 | 26 | 0 | 6 |
| 68 | 1 | 2 | 0 | 28 | 0 | 28 | 3 | 7 |
| 84 | 1 | 2 | 2 | 30 | 0 | 30 | 1 | 7 |
| 100 | 1 | 3 | 0 | 32 | 0 | 32 | 0 | 8 |
| 116 | 1 | 3 | 2 | 34 | 0 | 34 | 2 | 8 |
| 132 | 1 | 4 | 0 | 36 | 0 | 36 | 1 | 9 |
| 148 | 1 | 4 | 2 | 38 | 0 | 38 | 3 | 9 |

Sample collector 29₂

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 0 | 2 | 2 | 0 | 2 | 2 | 0 |
| 32 | 0 | 1 | 0 | 4 | 0 | 4 | 1 | 1 |
| 48 | 0 | 1 | 2 | 6 | 0 | 6 | 3 | 1 |
| 64 | 0 | 2 | 0 | 8 | 0 | 8 | 2 | 2 |
| 80 | 0 | 2 | 2 | 10 | 0 | 10 | 0 | 2 |
| 96 | 0 | 3 | 0 | 12 | 0 | 12 | 3 | 3 |
| 112 | 0 | 3 | 2 | 14 | 0 | 14 | 1 | 3 |
| 128 | 0 | 4 | 0 | 16 | 0 | 16 | 0 | 4 |
| 144 | 0 | 4 | 2 | 18 | 0 | 18 | 2 | 4 |

Sample collector 29₁

Fig. 13E

| k   | 4 |
|-----|---|
| d   | 3 |
| w_m | 4 |
| w_s | 8 |
| S_1 | 2 |
| S_2 | 5 |
| S_3 | 2 |

Range
Pulse
Channel

Global assignment of addresses and chip selects

| A_3 | A_2 | A_1 | A_S | I_S | A_P | CS | A_M |
|-----|-----|-----|-----|-----|-----|----|-----|
| 0 | 0 | 0 | 0 | 0 | 0 | 0 | 0 |
| 0 | 0 | 0 | 0 | 1 | 1 | 1 | 0 |
| 0 | 0 | 1 | 2 | 0 | 2 | 2 | 0 |
| 0 | 0 | 1 | 2 | 1 | 3 | 3 | 0 |
| 0 | 1 | 0 | 4 | 0 | 4 | 2 | 1 |
| 0 | 1 | 0 | 4 | 1 | 5 | 3 | 1 |
| 0 | 1 | 1 | 6 | 0 | 6 | 0 | 1 |
| 0 | 1 | 1 | 6 | 1 | 7 | 1 | 1 |
| 0 | 2 | 0 | 8 | 0 | 8 | 0 | 2 |
| 0 | 2 | 0 | 8 | 1 | 9 | 1 | 2 |
| 0 | 2 | 1 | 10 | 0 | 10 | 2 | 2 |
| 0 | 2 | 1 | 10 | 1 | 11 | 3 | 2 |
| 0 | 3 | 0 | 12 | 0 | 12 | 2 | 3 |
| 0 | 3 | 0 | 12 | 1 | 13 | 3 | 3 |
| 0 | 3 | 1 | 14 | 0 | 14 | 0 | 3 |
| 0 | 3 | 1 | 14 | 1 | 15 | 1 | 3 |
| 0 | 4 | 0 | 16 | 0 | 16 | 0 | 4 |
| 0 | 4 | 0 | 16 | 1 | 17 | 1 | 4 |
| 0 | 4 | 1 | 18 | 0 | 18 | 2 | 4 |
| 0 | 4 | 1 | 18 | 1 | 19 | 3 | 4 |
| 1 | 0 | 0 | 20 | 0 | 20 | 2 | 5 |
| 1 | 0 | 0 | 20 | 1 | 21 | 3 | 5 |
| 1 | 0 | 1 | 22 | 0 | 22 | 0 | 5 |
| 1 | 0 | 1 | 22 | 1 | 23 | 1 | 5 |
| 1 | 1 | 0 | 24 | 0 | 24 | 0 | 6 |
| 1 | 1 | 0 | 24 | 1 | 25 | 1 | 6 |
| 1 | 1 | 1 | 26 | 0 | 26 | 2 | 6 |
| 1 | 1 | 1 | 26 | 1 | 27 | 3 | 6 |
| 1 | 2 | 0 | 28 | 0 | 28 | 2 | 7 |
| 1 | 2 | 0 | 28 | 1 | 29 | 3 | 7 |
| 1 | 2 | 1 | 30 | 0 | 30 | 0 | 7 |
| 1 | 2 | 1 | 30 | 1 | 31 | 1 | 7 |
| 1 | 3 | 0 | 32 | 0 | 32 | 0 | 8 |
| 1 | 3 | 0 | 32 | 1 | 33 | 1 | 8 |
| 1 | 3 | 1 | 34 | 0 | 34 | 2 | 8 |
| 1 | 3 | 1 | 34 | 1 | 35 | 3 | 8 |
| 1 | 4 | 0 | 36 | 0 | 36 | 2 | 9 |
| 1 | 4 | 0 | 46 | 1 | 37 | 3 | 9 |
| 1 | 4 | 1 | 38 | 0 | 38 | 0 | 9 |
| 1 | 4 | 1 | 38 | 1 | 39 | 1 | 9 |

Fig. 14A

| Sample storage 22₄ | | Sample storage 22₃ | | Sample storage 22₂ | | Sample storage 22₁ | |
|---|---|---|---|---|---|---|---|
| A_M(4) | D_M(4) | A_M(3) | D_M(3) | A_M(2) | D_M(2) | A_M(1) | D_M(1) |
| 0 | (0,0,1) [1] | 0 | (0,0,1) [0] | 0 | (0,0,0) [1] | 0 | (0,0,0) [0] |
| 1 | (0,1,0) [1] | 1 | (0,1,0) [0] | 1 | (0,1,1) [1] | 1 | (0,1,1) [0] |
| 2 | (0,2,1) [1] | 2 | (0,2,1) [0] | 2 | (0,2,0) [1] | 2 | (0,2,0) [0] |
| 3 | (0,3,0) [1] | 3 | (0,3,0) [0] | 3 | (0,3,1) [1] | 3 | (0,3,1) [0] |
| 4 | (0,4,1) [1] | 4 | (0,4,1) [0] | 4 | (0,4,0) [1] | 4 | (0,4,0) [0] |
| 5 | (1,0,1) [1] | 5 | (1,0,1) [0] | 5 | (1,0,1) [1] | 5 | (1,0,1) [0] |
| 6 | (1,1,1) [1] | 6 | (1,1,1) [0] | 6 | (1,1,0) [1] | 6 | (1,1,0) [0] |
| 7 | (1,2,0) [1] | 7 | (1,2,0) [0] | 7 | (1,2,1) [1] | 7 | (1,2,1) [0] |
| 8 | (1,3,1) [1] | 8 | (1,3,1) [0] | 8 | (1,3,0) [1] | 8 | (1,3,0) [0] |
| 9 | (1,4,0) [1] | 9 | (1,4,0) [0] | 9 | (1,4,1) [1] | 9 | (1,4,1) [0] |

Fig. 14B

Accesses along dimension 1 (range)

No wait states (because only one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 0 | 0 | 1 | 2 | 1 | 3 | 3 | 0 |
| 28 | 0 | 1 | 1 | 6 | 1 | 7 | 1 | 1 |
| 44 | 0 | 2 | 1 | 10 | 1 | 11 | 3 | 2 |
| 60 | 0 | 3 | 1 | 14 | 1 | 15 | 1 | 3 |
| 76 | 0 | 4 | 1 | 18 | 1 | 19 | 3 | 4 |
| 92 | 1 | 0 | 1 | 22 | 1 | 23 | 1 | 5 |
| 108 | 1 | 1 | 1 | 26 | 1 | 27 | 3 | 6 |
| 124 | 1 | 2 | 1 | 30 | 1 | 31 | 1 | 7 |
| 140 | 1 | 3 | 1 | 34 | 1 | 35 | 3 | 8 |
| 156 | 1 | 4 | 1 | 38 | 1 | 39 | 1 | 9 |

Sample collector 29₄

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 0 | 0 | 1 | 2 | 0 | 2 | 2 | 0 |
| 24 | 0 | 1 | 1 | 6 | 0 | 6 | 0 | 1 |
| 40 | 0 | 2 | 1 | 10 | 0 | 10 | 2 | 2 |
| 56 | 0 | 3 | 1 | 14 | 0 | 14 | 0 | 3 |
| 72 | 0 | 4 | 1 | 18 | 0 | 18 | 2 | 4 |
| 88 | 1 | 0 | 1 | 22 | 0 | 22 | 0 | 5 |
| 104 | 1 | 1 | 1 | 26 | 0 | 26 | 2 | 6 |
| 120 | 1 | 2 | 1 | 30 | 0 | 30 | 0 | 7 |
| 136 | 1 | 3 | 1 | 34 | 0 | 34 | 2 | 8 |
| 152 | 1 | 4 | 1 | 38 | 0 | 38 | 0 | 9 |

Sample collector 29₃

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 0 | 0 | 0 | 0 | 1 | 1 | 1 | 0 |
| 20 | 0 | 1 | 0 | 4 | 1 | 5 | 3 | 1 |
| 36 | 0 | 2 | 0 | 8 | 1 | 9 | 1 | 2 |
| 52 | 0 | 3 | 0 | 12 | 1 | 13 | 3 | 3 |
| 68 | 0 | 4 | 0 | 16 | 1 | 17 | 1 | 4 |
| 84 | 1 | 0 | 0 | 20 | 1 | 21 | 3 | 5 |
| 100 | 1 | 1 | 0 | 24 | 1 | 25 | 1 | 6 |
| 116 | 1 | 2 | 0 | 28 | 1 | 29 | 3 | 7 |
| 132 | 1 | 3 | 0 | 32 | 1 | 33 | 1 | 8 |
| 148 | 1 | 4 | 0 | 36 | 1 | 37 | 3 | 9 |

Sample collector 29₂

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 1 | 0 | 4 | 0 | 4 | 2 | 1 |
| 32 | 0 | 2 | 0 | 8 | 0 | 8 | 0 | 2 |
| 48 | 0 | 3 | 0 | 12 | 0 | 12 | 2 | 3 |
| 64 | 0 | 4 | 0 | 16 | 0 | 16 | 0 | 4 |
| 80 | 1 | 0 | 0 | 20 | 0 | 20 | 2 | 5 |
| 96 | 1 | 1 | 0 | 24 | 0 | 24 | 0 | 6 |
| 112 | 1 | 2 | 0 | 28 | 0 | 28 | 2 | 7 |
| 128 | 1 | 3 | 0 | 32 | 0 | 32 | 0 | 8 |
| 144 | 1 | 4 | 0 | 36 | 0 | 36 | 2 | 9 |

Sample collector 29₁

Fig. 14C

Accesses along dimension 2 (pulse)

No wait states (even though more than one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 0 | 1 | 0 | 4 | 1 | 5 | 3 | 1 |
| 28 | 0 | 3 | 0 | 12 | 1 | 13 | 3 | 3 |
| 44 | 0 | 0 | 1 | 2 | 1 | 3 | 3 | 0 |
| 60 | 0 | 2 | 1 | 10 | 1 | 11 | 3 | 2 |
| 76 | 0 | 4 | 1 | 18 | 1 | 19 | 3 | 4 |
| 92 | 1 | 1 | 0 | 24 | 1 | 25 | 1 | 6 |
| 108 | 1 | 3 | 0 | 32 | 1 | 33 | 1 | 8 |
| 124 | 1 | 0 | 1 | 22 | 1 | 23 | 1 | 5 |
| 140 | 1 | 2 | 1 | 30 | 1 | 31 | 1 | 7 |
| 156 | 1 | 4 | 1 | 38 | 1 | 39 | 1 | 9 |

Sample collector $29_4$

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 0 | 1 | 0 | 4 | 0 | 4 | 2 | 1 |
| 24 | 0 | 3 | 0 | 12 | 0 | 12 | 2 | 3 |
| 40 | 0 | 0 | 1 | 2 | 0 | 2 | 2 | 0 |
| 56 | 0 | 2 | 1 | 10 | 0 | 10 | 2 | 2 |
| 72 | 0 | 4 | 1 | 18 | 0 | 18 | 2 | 4 |
| 88 | 1 | 1 | 0 | 24 | 0 | 24 | 0 | 6 |
| 104 | 1 | 3 | 0 | 32 | 0 | 32 | 0 | 8 |
| 120 | 1 | 0 | 1 | 22 | 0 | 22 | 0 | 5 |
| 136 | 1 | 2 | 1 | 30 | 0 | 30 | 0 | 7 |
| 152 | 1 | 4 | 1 | 38 | 0 | 38 | 0 | 9 |

Sample collector $29_3$

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 0 | 0 | 0 | 0 | 1 | 1 | 1 | 0 |
| 20 | 0 | 2 | 0 | 8 | 1 | 9 | 1 | 2 |
| 36 | 0 | 4 | 0 | 16 | 1 | 17 | 1 | 4 |
| 52 | 0 | 1 | 1 | 6 | 1 | 7 | 1 | 1 |
| 68 | 0 | 3 | 1 | 14 | 1 | 15 | 1 | 3 |
| 84 | 1 | 0 | 0 | 20 | 1 | 21 | 2 | 5 |
| 100 | 1 | 2 | 0 | 28 | 1 | 29 | 2 | 7 |
| 116 | 1 | 4 | 0 | 36 | 1 | 37 | 2 | 9 |
| 132 | 1 | 1 | 1 | 26 | 1 | 27 | 2 | 6 |
| 148 | 1 | 3 | 1 | 34 | 1 | 35 | 2 | 8 |

Sample collector $29_2$

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 2 | 0 | 8 | 0 | 8 | 0 | 2 |
| 32 | 0 | 4 | 0 | 16 | 0 | 16 | 0 | 4 |
| 48 | 0 | 1 | 1 | 6 | 0 | 6 | 0 | 1 |
| 64 | 0 | 3 | 1 | 14 | 0 | 14 | 0 | 3 |
| 80 | 1 | 0 | 0 | 20 | 0 | 20 | 2 | 5 |
| 96 | 1 | 2 | 0 | 28 | 0 | 28 | 2 | 7 |
| 112 | 1 | 4 | 0 | 36 | 0 | 36 | 2 | 9 |
| 128 | 1 | 1 | 1 | 26 | 0 | 26 | 2 | 6 |
| 144 | 1 | 3 | 1 | 34 | 0 | 34 | 2 | 8 |

Sample collector $29_1$

Fig. 14D

Accesses along dimension 3 (channel)

No wait states (because only one dimensional address changes)

| A_L(4) | A_3(4) | A_2(4) | A_1(4) | A_S(4) | I_S(4) | A_P(4) | CS(4) | A_M(4) |
|---|---|---|---|---|---|---|---|---|
| 12 | 1 | 0 | 0 | 20 | 1 | 21 | 3 | 5 |
| 28 | 1 | 0 | 1 | 22 | 1 | 23 | 1 | 5 |
| 44 | 1 | 1 | 0 | 24 | 1 | 25 | 1 | 6 |
| 60 | 1 | 1 | 1 | 26 | 1 | 27 | 3 | 6 |
| 76 | 1 | 2 | 0 | 28 | 1 | 29 | 3 | 7 |
| 92 | 1 | 2 | 1 | 30 | 1 | 31 | 1 | 7 |
| 108 | 1 | 3 | 0 | 32 | 1 | 33 | 1 | 8 |
| 124 | 1 | 3 | 1 | 34 | 1 | 35 | 3 | 8 |
| 140 | 1 | 4 | 0 | 36 | 1 | 37 | 3 | 9 |
| 156 | 1 | 4 | 1 | 38 | 1 | 39 | 1 | 9 |

Sample collector $29_4$

| A_L(3) | A_3(3) | A_2(3) | A_1(3) | A_S(3) | I_S(3) | A_P(3) | CS(3) | A_M(3) |
|---|---|---|---|---|---|---|---|---|
| 8 | 1 | 0 | 0 | 20 | 0 | 20 | 2 | 5 |
| 24 | 1 | 0 | 1 | 22 | 0 | 22 | 0 | 5 |
| 40 | 1 | 1 | 0 | 24 | 0 | 24 | 0 | 6 |
| 56 | 1 | 1 | 1 | 26 | 0 | 26 | 2 | 6 |
| 72 | 1 | 2 | 0 | 28 | 0 | 28 | 2 | 7 |
| 88 | 1 | 2 | 1 | 30 | 0 | 30 | 0 | 7 |
| 104 | 1 | 3 | 0 | 32 | 0 | 32 | 0 | 8 |
| 120 | 1 | 3 | 1 | 34 | 0 | 34 | 2 | 8 |
| 136 | 1 | 4 | 0 | 36 | 0 | 36 | 2 | 9 |
| 152 | 1 | 4 | 1 | 38 | 0 | 38 | 0 | 9 |

Sample collector $29_3$

| A_L(2) | A_3(2) | A_2(2) | A_1(2) | A_S(2) | I_S(2) | A_P(2) | CS(2) | A_M(2) |
|---|---|---|---|---|---|---|---|---|
| 4 | 0 | 0 | 0 | 0 | 1 | 1 | 1 | 0 |
| 20 | 0 | 0 | 1 | 2 | 1 | 3 | 3 | 0 |
| 36 | 0 | 1 | 0 | 4 | 1 | 5 | 3 | 1 |
| 52 | 0 | 1 | 1 | 6 | 1 | 7 | 1 | 1 |
| 68 | 0 | 2 | 0 | 8 | 1 | 9 | 1 | 2 |
| 84 | 0 | 2 | 1 | 10 | 1 | 11 | 3 | 2 |
| 100 | 0 | 3 | 0 | 12 | 1 | 13 | 3 | 3 |
| 116 | 0 | 3 | 1 | 14 | 1 | 15 | 1 | 3 |
| 132 | 0 | 4 | 0 | 16 | 1 | 17 | 1 | 4 |
| 148 | 0 | 4 | 1 | 18 | 1 | 19 | 3 | 4 |

Sample collector $29_2$

| A_L(1) | A_3(1) | A_2(1) | A_1(1) | A_S(1) | I_S(1) | A_P(1) | CS(1) | A_M(1) |
|---|---|---|---|---|---|---|---|---|
| 0 | 0 | 0 | 0 | 0 | 0 | 0 | 0 | 0 |
| 16 | 0 | 0 | 1 | 2 | 0 | 2 | 2 | 0 |
| 32 | 0 | 1 | 0 | 4 | 0 | 4 | 2 | 1 |
| 48 | 0 | 1 | 1 | 6 | 0 | 6 | 0 | 1 |
| 64 | 0 | 2 | 0 | 8 | 0 | 8 | 0 | 2 |
| 80 | 0 | 2 | 1 | 10 | 0 | 10 | 2 | 2 |
| 96 | 0 | 3 | 0 | 12 | 0 | 12 | 2 | 3 |
| 112 | 0 | 3 | 1 | 14 | 0 | 14 | 0 | 3 |
| 128 | 0 | 4 | 0 | 16 | 0 | 16 | 0 | 4 |
| 144 | 0 | 4 | 1 | 18 | 0 | 18 | 2 | 4 |

Sample collector $29_1$

Fig. 14E

Range address map w_s = 4 bytes

| A_L | A_3 | A_2 | A_1 | A_P |
|---|---|---|---|---|
| 0 | 0 | 0 | 0 | 0 |
| 4 | 0 | 0 | 1 | 1 |
| 8 | 0 | 0 | 2 | 2 |
| 12 | 0 | 0 | 3 | 3 |
| 16 | 0 | 1 | 0 | 4 |
| 20 | 0 | 1 | 1 | 5 |
| 24 | 0 | 1 | 2 | 6 |
| 28 | 0 | 1 | 3 | 7 |
| 32 | 1 | 0 | 0 | 8 |
| 36 | 1 | 0 | 1 | 9 |
| 40 | 1 | 0 | 2 | 10 |
| 46 | 1 | 0 | 3 | 11 |
| 48 | 1 | 1 | 0 | 12 |
| 52 | 1 | 1 | 1 | 13 |
| 56 | 1 | 1 | 2 | 14 |
| 60 | 1 | 1 | 3 | 15 |
| 64 | 2 | 0 | 0 | 16 |
| 68 | 2 | 0 | 1 | 17 |
| 72 | 2 | 0 | 2 | 18 |
| 76 | 2 | 0 | 3 | 19 |
| 80 | 2 | 1 | 0 | 20 |
| 86 | 2 | 1 | 1 | 21 |
| 88 | 2 | 1 | 2 | 22 |
| 92 | 2 | 1 | 3 | 23 |

Fig. 16 w_s = 8 bytes

| A_L | A_3 | A_2 | A_1 | A_P |
|---|---|---|---|---|
| 0 | 0 | 0 | 0 | 0 |
| 4 | 0 | 0 | 0 | 1 |
| 8 | 0 | 0 | 1 | 2 |
| 12 | 0 | 0 | 1 | 3 |
| 16 | 0 | 1 | 2 | 4 |
| 20 | 0 | 1 | 2 | 5 |
| 24 | 0 | 1 | 3 | 6 |
| 28 | 0 | 1 | 3 | 7 |
| 32 | 0 | 0 | 0 | 8 |
| 36 | 0 | 0 | 0 | 9 |
| 40 | 0 | 0 | 1 | 10 |
| 46 | 0 | 1 | 1 | 11 |
| 48 | 0 | 1 | 2 | 12 |
| 52 | 0 | 1 | 2 | 13 |
| 56 | 0 | 1 | 3 | 14 |
| 60 | 1 | 1 | 3 | 15 |
| 64 | 1 | 0 | 0 | 16 |
| 68 | 1 | 0 | 0 | 17 |
| 72 | 1 | 0 | 1 | 18 |
| 76 | 1 | 0 | 1 | 19 |
| 80 | 1 | 0 | 2 | 20 |
| 86 | 1 | 0 | 2 | 21 |
| 88 | 1 | 0 | 3 | 22 |
| 92 | 1 | 0 | 3 | 23 |

Only first half shown

Fig. 17

Pulse address map

Fig. 18 — w_s = 4 bytes

| A_L | A_3 | A_2 | A_1 | A_P |
|---|---|---|---|---|
| 0 | 0 | 0 | 0 | 0 |
| 4 | 0 | 0 | 0 | 4 |
| 8 | 0 | 0 | 1 | 1 |
| 12 | 0 | 0 | 1 | 5 |
| 16 | 0 | 1 | 0 | 2 |
| 20 | 0 | 1 | 0 | 6 |
| 24 | 0 | 1 | 1 | 3 |
| 28 | 0 | 1 | 1 | 7 |
| 32 | 1 | 0 | 0 | 8 |
| 36 | 1 | 0 | 0 | 12 |
| 40 | 1 | 0 | 1 | 9 |
| 44 | 1 | 0 | 1 | 13 |
| 48 | 1 | 1 | 0 | 10 |
| 52 | 1 | 1 | 0 | 14 |
| 56 | 1 | 1 | 1 | 11 |
| 60 | 1 | 1 | 1 | 15 |
| 64 | 2 | 0 | 0 | 16 |
| 68 | 2 | 0 | 0 | 20 |
| 72 | 2 | 0 | 1 | 17 |
| 76 | 2 | 0 | 1 | 21 |
| 80 | 2 | 1 | 0 | 18 |
| 84 | 2 | 1 | 0 | 22 |
| 88 | 2 | 1 | 1 | 19 |
| 92 | 2 | 1 | 1 | 23 |

Fig. 19 — w_s = 8 bytes

| A_L | A_3 | A_2 | A_1 | A_P |
|---|---|---|---|---|
| 0 | 0 | 0 | 0 | 0 |
| 4 | 0 | 0 | 0 | 1 |
| 8 | 0 | 1 | 0 | 8 |
| 12 | 0 | 1 | 0 | 9 |
| 16 | 0 | 0 | 1 | 2 |
| 20 | 0 | 0 | 1 | 3 |
| 24 | 0 | 1 | 1 | 10 |
| 28 | 0 | 1 | 1 | 11 |
| 32 | 0 | 0 | 2 | 4 |
| 36 | 0 | 0 | 2 | 5 |
| 40 | 0 | 1 | 2 | 12 |
| 44 | 0 | 1 | 2 | 13 |
| 48 | 0 | 0 | 3 | 6 |
| 52 | 0 | 0 | 3 | 7 |
| 56 | 0 | 1 | 3 | 14 |
| 60 | 0 | 1 | 3 | 15 |
| 64 | 1 | 0 | 0 | 16 |
| 68 | 1 | 0 | 0 | 17 |
| 72 | 1 | 1 | 0 | 24 |
| 76 | 1 | 1 | 0 | 25 |
| 80 | 1 | 0 | 1 | 18 |
| 84 | 1 | 0 | 1 | 19 |
| 88 | 1 | 1 | 1 | 26 |
| 92 | 1 | 1 | 1 | 27 |

Only first half shown

Channel address map w_s = 4 bytes

| A_L | A_3 | A_2 | A_1 | A_P |
|---|---|---|---|---|
| 0 | 0 | 0 | 0 | 0 |
| 4 | 1 | 0 | 0 | 8 |
| 8 | 2 | 0 | 0 | 16 |
| 12 | 0 | 0 | 1 | 1 |
| 16 | 1 | 0 | 1 | 9 |
| 20 | 2 | 0 | 1 | 17 |
| 24 | 0 | 0 | 2 | 2 |
| 28 | 1 | 0 | 2 | 10 |
| 32 | 2 | 0 | 2 | 18 |
| 36 | 0 | 0 | 3 | 3 |
| 40 | 1 | 0 | 3 | 11 |
| 46 | 2 | 0 | 3 | 19 |
| 48 | 0 | 1 | 0 | 4 |
| 52 | 1 | 1 | 0 | 12 |
| 56 | 2 | 1 | 0 | 20 |
| 60 | 0 | 1 | 1 | 5 |
| 64 | 1 | 1 | 1 | 13 |
| 68 | 2 | 1 | 1 | 21 |
| 72 | 0 | 1 | 2 | 6 |
| 76 | 1 | 1 | 2 | 14 |
| 80 | 2 | 1 | 2 | 22 |
| 86 | 0 | 1 | 3 | 7 |
| 88 | 1 | 1 | 3 | 15 |
| 92 | 2 | 1 | 3 | 23 |

Fig. 20 w_s = 8 bytes

| A_L | A_3 | A_2 | A_1 | A_P |
|---|---|---|---|---|
| 0 | 0 | 0 | 0 | 0 |
| 4 | 0 | 0 | 0 | 1 |
| 8 | 1 | 0 | 0 | 16 |
| 12 | 1 | 0 | 0 | 17 |
| 16 | 2 | 0 | 0 | 32 |
| 20 | 2 | 0 | 0 | 33 |
| 24 | 0 | 0 | 1 | 2 |
| 28 | 0 | 0 | 1 | 3 |
| 32 | 1 | 0 | 1 | 18 |
| 36 | 1 | 0 | 1 | 19 |
| 40 | 2 | 0 | 1 | 34 |
| 46 | 2 | 0 | 1 | 35 |
| 48 | 0 | 0 | 2 | 4 |
| 52 | 0 | 0 | 2 | 5 |
| 56 | 1 | 0 | 2 | 20 |
| 60 | 1 | 0 | 2 | 21 |
| 64 | 2 | 0 | 2 | 36 |
| 68 | 2 | 0 | 2 | 37 |
| 72 | 0 | 0 | 3 | 6 |
| 76 | 0 | 0 | 3 | 7 |
| 80 | 1 | 0 | 3 | 22 |
| 86 | 1 | 0 | 3 | 23 |
| 88 | 2 | 0 | 3 | 38 |
| 92 | 2 | 0 | 3 | 39 |

Only first half shown

Fig. 21

MEMORY ACCESS UNIT AND METHOD INCLUDING GENERATING MEMORY SELECTS TO CONCURRENTLY ACCESS A PLURALITY OF MEMORIES IN A MULTI-DIMENSIONAL ARRAY

FIELD OF THE INVENTION

The present invention relates to a memory access unit and to a memory controller comprising one or more memory access units.

BACKGROUND

Motor vehicles are increasing being equipped with different forms of sensors for detecting harmful situations. These sensors produce large amounts of data in multiple dimensions. Ideally, samples should be stored sequentially in memory to allow hardware accelerators to process them efficiently. However, there is often a need to process samples in more than one dimension.

One solution is to re-order samples between processing steps. However, this increases computation overhead and memory requirements.

Another solution is to employ memory which allows data to be read out in orthogonal dimensions. An example of such a memory is described in WO 2009/003115 A1.

SUMMARY

The present invention seeks to provide a memory access unit for handling transfers of data words of fixed size (herein referred to as "samples").

According to a first aspect of the present invention there is provided a memory access unit for handling transfers of samples in a d-dimensional array between one of m data buses, where m≥1, and k*m memories, where k≥2. The memory access unit comprises k address calculators and k sample collectors. Each address calculator is configured to receive a bus address, to add a respective offset to generate a sample bus address and to generate, from the sample bus address according to an addressing scheme, a respective address in each of the d dimensions for accessing a respective sample. Each sample collector is operable to generate a memory select for a respective one of the k*m memories so as to transfer the sample between a predetermined position in a bus data word and the respective one of the k*m memories. Each sample collector is configured to calculate a respective memory select in dependence upon the address in each of the d dimensions such that each sample collector selects a different one of the k memories so as to allow the sample collectors to access k of the k*m memories concurrently. For a single bus, m=1 and k*m=k. Each sample collector may be operable to transfer the respective sample to or from the respective one of the k*m memories.

Thus, samples can be accessed (read or write) along any of the dimensions without sample re-ordering in the order of the dimension.

A sample data width and a sample storage data width may be the same. The sample data width may be an integer multiple of (for example, double) the sample storage data width. The sample data width may be settable to be, for example, four bytes, consisting of 32 bits, or eight bytes, consisting of 64 bits. The storage data width may be, for example, four bytes, consisting of 32 bits. However, other storage data widths may be used. The data bus width may be 16 bytes, consisting of 128 bits, or 32 bytes, consisting of 256 bits.

The memory access unit may further comprise a set of registers for changeably setting the numbers of samples in each of the d dimensions and/or sample data width.

The number d of dimensions may be settable to be two or three.

Each sample collector may be configured to calculate the respective memory select in dependence upon a sum of the addresses in each of the d dimensions.

Each sample collector may be configured to calculate the memory select, CS, using:

$$CS=[(A\_1+A\_2+\ldots+A\_d)]\% \, k$$

Each address calculator may be configured to generate an index. This may be used when the sample data width is greater than the sample storage or memory data width.

Each sample collector may be configured to calculate a memory select, CS, using:

$$CS=[I\_S+(w\_s/w\_m)*(A\_1+A\_2+\ldots+A\_d)]\% \, k$$

where w_s is the sample data width and w_m is memory data width.

Each address calculator may be configured to calculate the respective addresses in dependence upon a linearly-increasing word address, sample data width or size and numbers of samples in each dimension.

Each address calculator may be configured to receive a bus address and to adjust the bus address based on a respective offset. Thus, the address calculators can generate respective sets of addresses and, thus, generate different memory selects.

The memory access unit may further comprise a bus interface coupled to the address calculators and the sample collectors. The bus interface may be configured to pass a bus address to each of the address calculators.

The memory access unit is preferably implemented in hardware logic.

The memory access unit may be suitable for handling transfers of samples in a d-dimensional array between a data bus and k*m memories, where the k*m memories are shared by m data buses.

According to a second aspect of the present invention there is provided a memory controller comprising at least one memory access unit.

The memory controller may comprise at least two memory access units. The at least two memory access units may access a common (or "global") set of registers.

The memory controller may comprise m memory access units for handling transfers of samples in a d-dimensional array between m data buses and k*m memories.

According to a third aspect of the present invention there is provided a memory system comprising a memory controller and k*m memories, each set of k*m memories operatively connected to the m memory access units.

There may be one data bus, i.e. m=1. There may be more than one data bus, i.e. m≥2. There may be between two and ten, or more, data buses, i.e. 10≥m≥2, or m>10.

According to a fourth aspect of the present invention there is provided an integrated circuit comprising a memory access unit or a memory controller.

The integrated circuit may be a microcontroller. The integrated circuit may be an application specific integrated circuit (ASIC). The integrated circuit may be a system on a chip (SoC). The integrated circuit may be a hardware accelerator. The integrated circuit may be a graphical processing unit (GPU). The integrated circuit may be a digital signal processor (DSP).

According to a fifth aspect of the present invention there is provided a motor vehicle comprising a computing device comprising a memory access unit or a memory controller.

The motor vehicle may be a motorcycle, an automobile (sometimes referred to as a "car"), a minibus, a bus, a truck or lorry. The motor vehicle may be powered by an internal combustion engine and/or one or more electric motors.

According to a sixth aspect of the present invention there is provided a method of transferring samples in a d-dimensional array between one of m data buses and k*m memories. The method comprises, for each of k samples: receiving a bus address and adding a respective offset to generate a sample bus address and generating, from the sample bus address according to an addressing scheme, a respective address in each of the d dimensions for accessing samples along one of the dimensions and generating a memory select for a respective one of the k*m memories, where m≥1, and k≥2, so as to transfer a sample between a predetermined position in a bus data word and the respective one of the k*m memories, wherein generating the memory select comprises calculating a memory select in dependence upon the addresses in each of the d dimensions so as to allow the k samples to be written to or read from k of the k*m memories concurrently.

The method can be performed by a unit (or module) such that it allows the unit and other units to access the k*m memories concurrently.

The method is preferably a hardware-implemented method. The unit (or module) may be a logic unit (or "logic module").

According to a seventh aspect of the present invention there is provided a computer program comprising instructions which, when executed by one or more processors, causes the one or more processors to perform the method.

According to an eighth aspect of the present invention there is provided a computer readable medium (which may be non-transitory) carrying or storing the computer program.

BRIEF DESCRIPTION OF THE DRAWINGS

Certain embodiments of the present invention will now be described, by way of example, with reference to the accompanying drawings, in which:

FIG. 4 illustrates how samples can be accessed along a first dimension using the full width of a data bus;

FIG. 5 illustrates how samples can be accessed along a second dimension which does not use the full width of the data bus;

FIG. 6B illustrates configuration registers;

FIG. 7 illustrates a simple two-dimensional array of samples which can be stored in the memory shown in FIG. 6A;

FIG. 8 illustrates how, using the memory access unit shown in FIG. 6A, samples can be accessed along a first dimension using the full width of a data bus;

FIG. 9 illustrates how, using the memory access unit shown in FIG. 6A, samples can be accessed along a second dimension using the full width of a data bus;

FIG. 13A shows a first set of parameters for a configuration register and a first set of addresses and chip selects in a memory system in which the sample data width is the same as the memory data width;

FIG. 13B shows contents of first, second, third and fourth sample storages;

FIGS. 13C, 13D and 13E illustrate operation of first, second, third and fourth sample collectors when accessing first, second, third and fourth sample storages shown in FIG. 13B;

FIG. 14A shows a second set of parameters for a configuration register and a second set of addresses and chip selects in a memory system in which the sample data width is double the memory data width;

FIG. 14B shows contents of first, second, third and fourth sample storages;

FIGS. 14C, 14D and 14E illustrate operation of first, second, third and fourth sample collectors when accessing first, second, third and fourth sample storages shown in FIG. 14B;

FIG. 16 shows dimensional addresses for a range address map in a case where the sample data width is the same as the memory data width;

FIG. 17 shows dimensional addresses for a range address map in a case where the sample data width is double the memory data width;

FIG. 18 shows dimensional addresses for a pulse address map in a case where the sample data width is the same as the memory data width;

FIG. 19 shows dimensional addresses for a pulse address map in a case where the sample data width is double the memory data width;

FIG. 20 shows dimensional addresses for a channel address map in a case where the sample data width is the same as the memory data width;

FIG. 21 shows dimensional addresses for a channel address map in a case where the sample data width is double the memory data width;

DETAILED DESCRIPTION OF CERTAIN EMBODIMENTS

In the following description, all constants, variables and registers are of type integer unless otherwise specified.

Memory System 1

Figure 1:
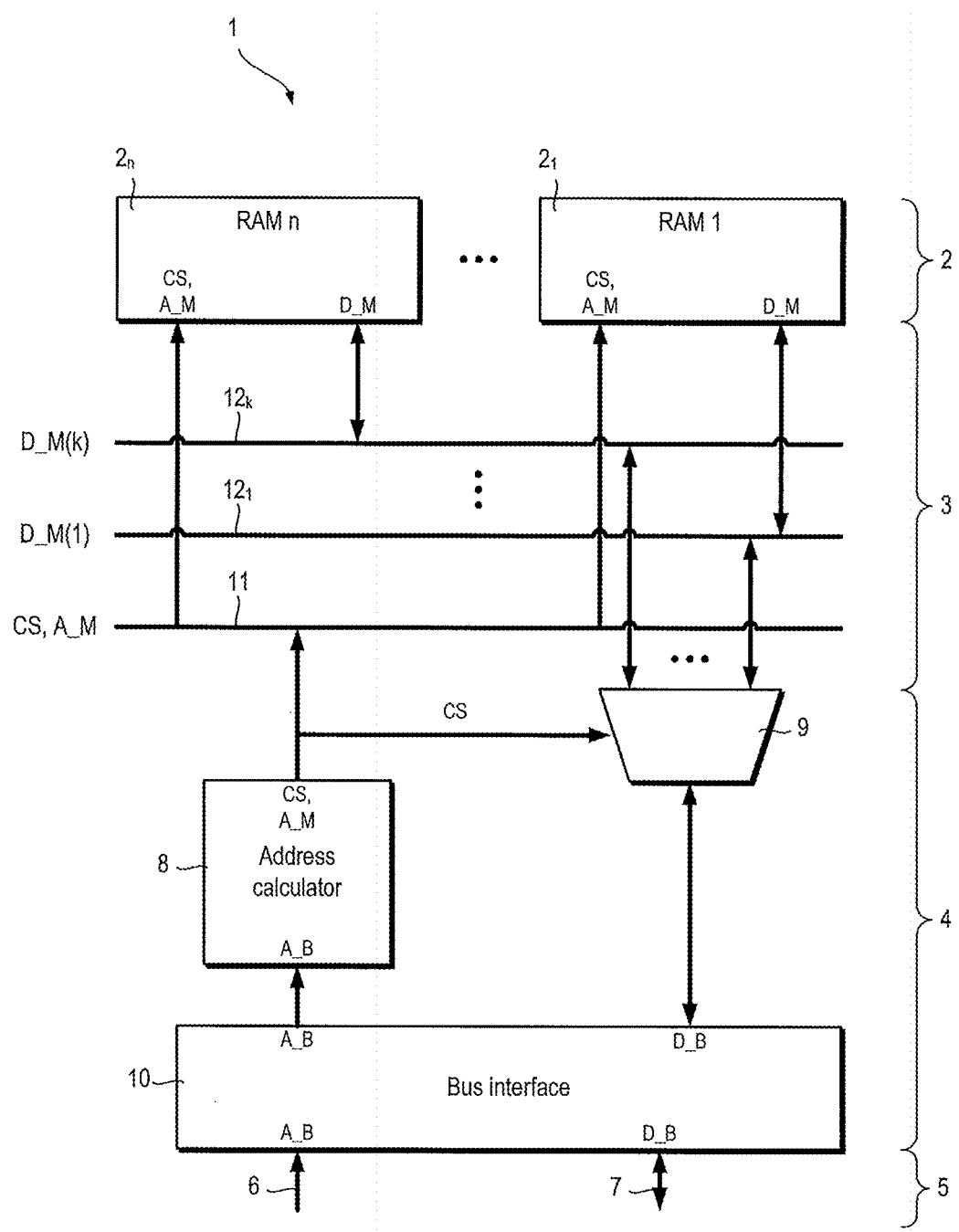
FIG. 1 is a schematic block diagram of a memory system which includes memory which is useful for understanding the present invention.

FIG. 1 is a schematic block diagram of a memory system 1 which is useful for understanding the present invention.

Referring to FIG. 1, the memory system 1 includes memory 2 in the form of an array of n random access memory (RAM) modules $2_1, \ldots, 2_n$ (where n is an integer greater than one). The memory modules $2_1, \ldots, 2_n$ may take the form of memory macros. The memory system 1 also includes bus wiring 3 and a memory access circuit 4 interconnecting the memory 2 and a bus 5 which consists of an address bus 6 and a data bus 7.

The memory access circuit 4 includes an address calculator 8 (which may also be referred to as an "address decoder"), a data multiplexer 9 and a bus interface 10.

Each memory module $2_1, \ldots, 2_n$ has a memory data width w_m. In this example, the memory data width w_m is 128 bits. In this example, the data bus 7 is 128 bits wide.

The address calculator 8 selects one RAM module $2_1, \ldots, 2_n$ from n RAM modules $2_1, \ldots, 2_n$ using a chip select signal CS and specifies a part of memory 2 to be accessed using a memory address A_M, via chip select and memory address buses 11. The address calculator 8 calculates chip select CS and memory address A_M using a bus address A_B received on the address bus 6 via the bus interface 10.

In a write transfer, bus data D_B are placed on memory data bus $12_1, \ldots, 12_k$. The data are stored in one of the RAM modules $2_1, \ldots, 2_n$ upon selection using chip select CS at a respective address A_M. The bus interface can request only part of the bus data D_B to be stored.

In a read transfer, a selected RAM module $2_1, \ldots, 2_n$ can transfer memory data D_M to the bus interface 10. The bus interface 10 can request only part of memory data D_M be transferred.

Referring also to FIGS. 2 to 5, data is transferred in fixed-sized units 13 (herein referred to as "words" or "samples" 13). Each memory $2_1, \ldots, 2_n$ has a width w_m which is an integer multiple of the sample data width or size. In this case, width w_m is 128 bits and each sample 13 is four bytes long and contains 32 bits. Thus, if the full bus width is to be used, then samples 13 should be stored in (or written to) adjacent positions across memory.

Figures 2, 3:
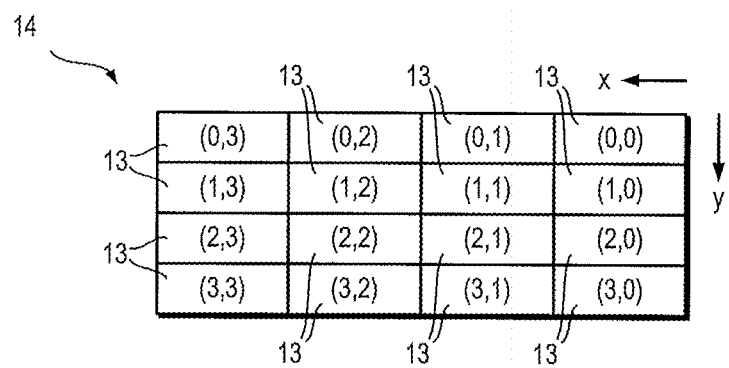
FIG. 2 illustrates a simple two-dimensional array of samples which can be stored in the memory shown in FIG. 1.
FIG. 3 shows how samples shown in FIG. 2 are stored in first and second memory modules at linearly increasing addresses.

FIG. 2 schematically shows a simple two-dimensional picture (or "image") 14 which comprises 4×4 samples 13 arranged in a two-dimensional array having x and y dimensions.

FIG. 3 shows how the picture 14 (FIG. 2) can be stored in memory 2, i.e. in first and second memory modules $2_1, 2_2$ (FIG. 2), addressable with chip selects CS equal to 0 and 1 respectively, at linearly-increasing addresses A_M.

The picture 14 (FIG. 2) can be processed in either dimension, that is, along the x dimension or along the y dimension. In this example, samples 13 can be transferred over a data bus 7 (FIG. 1) that can carry up to four samples 13 in each cycle.

FIGS. 4 and 5 illustrate bus transfer performance when data is transferred by accessing samples 13 along the x dimension and the y dimension respectively.

As shown in FIG. 4, if samples 13 are read out by accessing the picture 14 along the x dimension, then the full width of the data bus 7 can be utilized. However, as shown in FIG. 5, if samples 13 are read out by accessing the picture 14 along the y dimension, then only one sample 13 can be transferred at a time, i.e. per cycle.

Thus, when samples 13 are read out along the y dimension, performance is degraded by a factor of four.

Performance can be degraded even further if data transfer occurs in bursts. Bus systems can have long latencies. If an access request is made, it may be necessary to wait a several cycles before data is transferred. Hence, modern bus systems transfer multiple data words in sequence (called "burst") with each request. However, bursts require that the address for each data word increases linearly without jumps. Therefore, they cannot be used to transfer the samples in the y direction, reducing the performance even more.

If more than one sample is transferred in a bus word, then the full width of a bus cannot be used unless the sample order matches the storage order. However, often there is a need to read out samples along more than one dimension, for example, in image processing and radar applications, and other applications which involve multi-dimensional data access or transpositions, such as in multi-dimensional fast Fourier transform (FFT) processing. Some applications, such as radar, are automotive applications. In accordance with the present invention, memory access units and memory access methods can allow samples to be read out along different dimensions without the need for sample re-ordering and/or which can help improve bus utilization.

Memory System 21

Figure 6A:
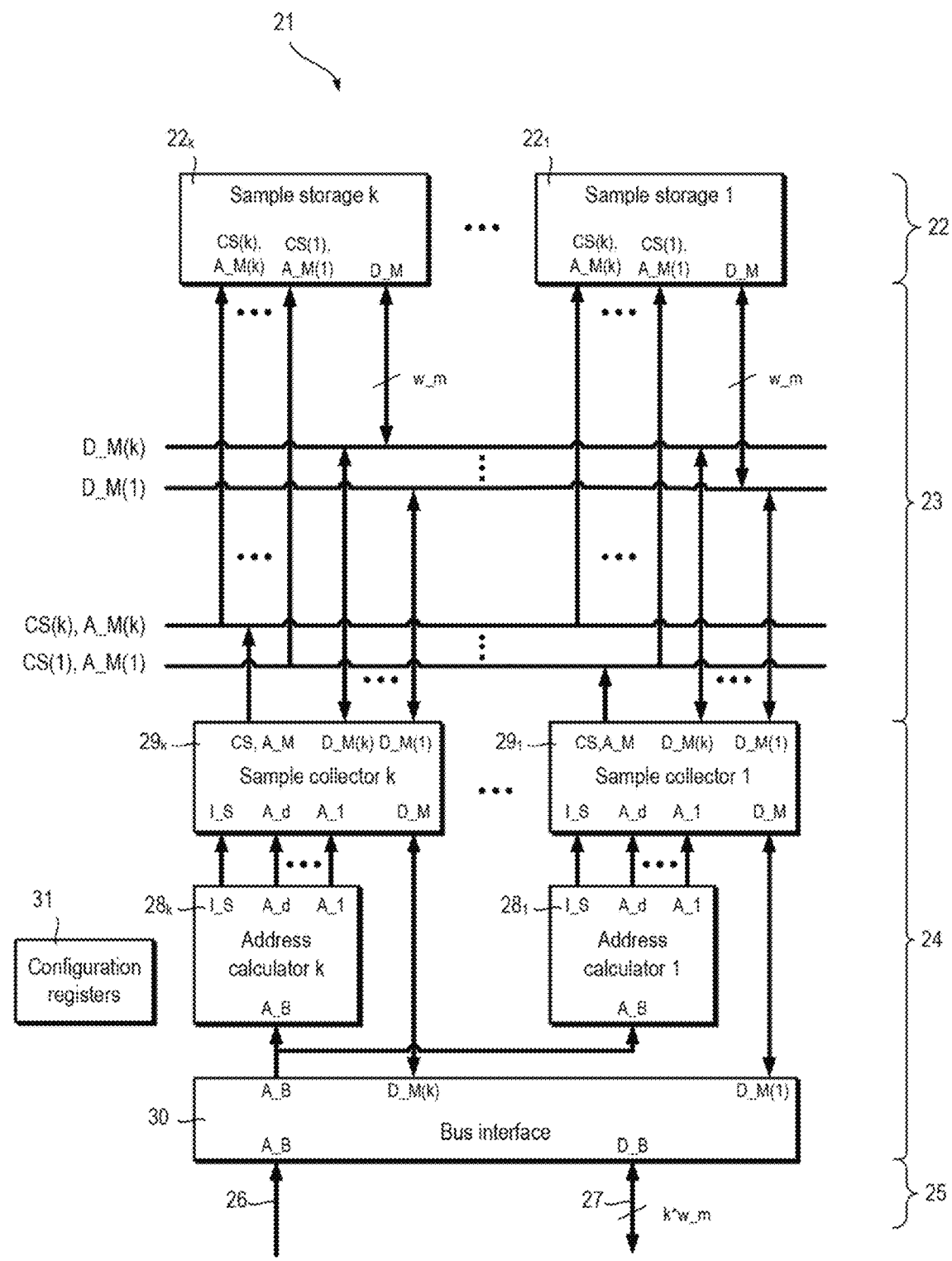
FIG. 6A is schematic block diagram of a memory system which includes memory and a memory access unit in accordance with the present invention.

FIG. 6A is a schematic block diagram of a reconfigurable multi-dimensionally accessible memory system 21 in accordance with the present invention.

Referring to FIG. 6A, the memory system 21 includes memory 22 in the form of an array of k sample storage modules $22_1, \ldots, 22_k$ (where k is an integer greater than one). Each sample storage module $22_1, \ldots, 22_k$ takes the form of a RAM macro or other RAM module. The memory system 21 includes bus wiring 23 and a memory access unit 24 interconnecting the memory 22 and a bus 25 which consists of an address bus 26 and a data bus 27.

The memory access unit 24 includes an array of k address calculator modules $28_1, \ldots, 28_k$, an array of k sample collector modules $29_1, \ldots, 29_k$, a common bus interface 30 and a set of configuration registers 31.

Each memory module $22_1, \ldots, 22_n$ has a memory data width w_m. The memory data width w_m and the minimum sample data width are the same. In this example, the data bus 27 is 128 bits wide. However, the data bus 27 can be narrower or wider, for example, 256 bits wide.

Referring also to FIG. 6B, the configuration registers 31 include a set of registers $31_1, 31_2, \ldots, 31_d$ (where d is a positive integer more than one) specifying the number of samples S_i which can be stored in each dimension i, where i={1, 2, . . . , d}, and a register $31_s$ specifying sample data width w_s. The memory data width w_m is equal to or an integer multiple of the sample data width w_s. The configuration registers 31 are set by a user before the memory system 21 is used.

Referring again to FIG. 6A, an address calculator module $28_1, \ldots, 28_k$ receives the bus address A_B, adds a respective offset corresponding to the position Nr of the sample in the bus data word to obtain a bus address A_B' for a respective sample, and converts the sample bus address A_B' into a set of sample addresses A_1, . . . , A_d and a sample index I_S according to an address decoding scheme. The bus address A_B' for a sample is calculated using:

$$A\_B' = A\_B + (Nr-1) * w\_m \quad (1)$$

where Nr=1, 2, . . . , k and memory data width w_m.

An example of an address decoding scheme for three-dimensional accesses in radar signal processing is described hereinafter. However, any suitable address decoding scheme can be used. The dimension address A_L is the linear address along the access dimension.

FIG. 7 schematically shows a simple two-dimensional picture (or "image") 33 which comprises 4×4 samples 34 arranged in a two-dimensional array having x and y dimensions.

Referring to FIGS. 7 and 8, an i-th sample collector 29, (where i={1, 2, ..., k}) is responsible for collecting a sample 34 at a fixed bit position [w_m*8*i−1:w_m*8*(i−1)] in the bus data word.

A sample collector $29_1, \ldots, 29_k$ identifies a sample storage $22_1, \ldots, 22_k$ in which a requested sample 33 is stored or is to be stored, selects the identified sample storage $22_1, \ldots, 22_k$ using a select signal CS, requests transfer (read or write) of the sample 34 at the address A_M and fills or retrieves the sample 34 at the assigned position in the bus data word D_B.

A dedicated sample collector $29_1, \ldots, 29_k$ exists for each sample 34 in the bus data word D_B. As will be explained in more detail later, the sample collectors $29_1, \ldots, 29_k$ perform memory access in parallel using a chip select arrangement which ensures that there are no access conflicts in sample storage $22_1, \ldots, 22_k$. Thus, the full bus data width can be utilized without introducing wait states.

FIGS. 8 and 9 illustrate bus transfer performance when data is transferred by accessing samples 34 along x and y dimensions respectively.

As shown in FIG. 8, if samples 34 are read out by accessing a picture 33 along the x dimension, then the full width (in this case, 128 bits) of the data bus 27 can be utilized.

And, as shown in FIG. 9, if samples 34 are read out by accessing a picture 33 along they dimension, then the full width of the data bus 27 can be employed.

Accesses along the x and y dimensions can utilize the full bus width, in this case, four samples per bus data word. Furthermore, bursts are possible since A_L linearly increases, without jumps. This can further improve performance. For example, if the bus 25 is an Advanced eXtensible Interface (AXI) bus with ten pipeline stages, a single access requires ten cycles per word. A 16-beat burst requires ten cycles for the initial word and fifteen cycles for the remaining words. On average, one word requires 25/16=1.6 cycles per word. This is another speed up by an additional factor of six.

Thus, compared with the memory system 1 shown in FIG. 1 in which samples are ordered along the memory address, the memory system 21 can transfer data along the y dimension at a rate which is 24 times faster.

Figure 10:
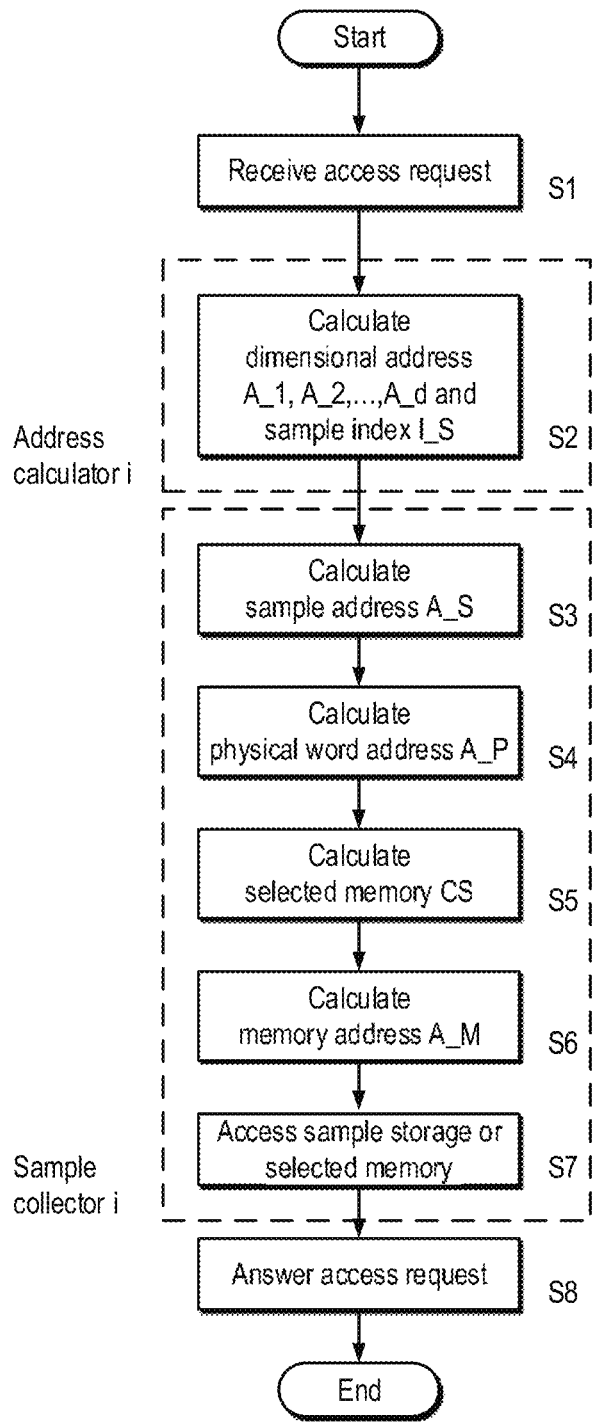
FIG. 10 is a process flow diagram of a method performed by the memory access unit shown in FIG. 6A.

Referring again to FIG. 6A and FIG. 10, when an access request is received (step S1), an address calculator module $28_1, \ldots, 28_k$ converts the bus address A_B into a dimensional address in the multi-dimensional data array (step S2).

Each sample 34 is addressed within the array by its dimension address A_1, A_2, ..., A_d and sample index I_S. The sample index I_S is used if the sample width w_s is greater than the sample storage width w_m.

Since the bus data word D_B contains more than one sample, a bus access field indicates along which dimension access is requested. Several bus address calculation schemes are possible which identify encoding access direction, linear address A_L and index.

Each sample collector $29_1, \ldots, 29_k$ computes, or calculates a sample address, a physical word address, a selected memory chip select (CS) and a memory address (steps S3 to S6) using equations 2 to 5 below:

a sample address A_S using:

$$A\_S = (A\_d \star (S\_d-1 \star S\_d-2 \star \ldots \star S\_1) + \qquad (2)$$
$$A\_d-1 \star (S\_d-2 \star S\_d-3 \star \ldots \star S\_1) +$$
$$\ldots + A\_1) \star (W\_s / W\_m)$$

a physical word address A_P using:
$$A\_P = A\_S + I\_S \qquad (3)$$

a selected memory CS using:
$$CS = [I\_S + (w\_s/w\_m) \star (A\_1 + A\_2 + \ldots + A\_d)] \% k \qquad (4)$$

an address in memory A_M using:
$$A\_M = A\_P/k \qquad (5)$$

where + is addition, − is subtraction, / is integer division (fractions are discarded), % is remainder of integer division (i.e. modulo) and * is integer multiplication.

Each sample collector $29_1, \ldots, 29_k$ accesses a respective sample storage $22_1, \ldots, 22_k$ (step S7). The bus interface answers the access request (step S8).

The selected memory chip select CS(1), ..., CS(k) is different for adjacent samples in every dimension. If accesses occur along dimension j (j={1, ..., d}), only the dimension address A_j changes in equation 4. The other dimension addresses A_i (i={1, ..., d}, i< >j) remain constant. However, for the term which changes, the term is different for adjacent addresses in the accessed dimension. Thus, parallel accesses to sample storages are possible.

There is, however, an exception to this arrangement, namely when a transaction crosses an access dimension boundary. In that case, more than one term changes in the selected memory CS equation or calculation. Depending on the chosen sizes, wait states may be necessary. No wait states occur if each dimension size S_1, S_2, ..., S_d is a multiple of w_m*k/w_s. A memory access system which has multiple bus interfaces and which uses wait states is described hereinafter.

Application of the Memory System 21 in a Radar Application

Figure 11:
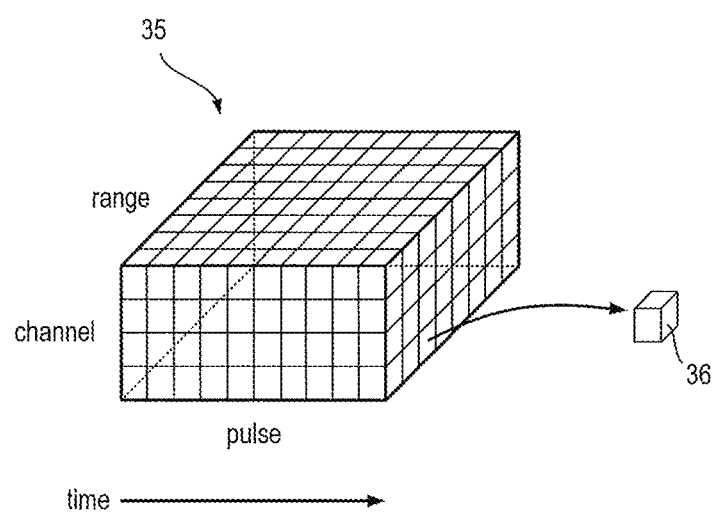
FIG. 11 illustrates a three-dimensional array of samples.

Referring to FIG. 11, in radar applications, multiple time responses from an antenna vector (not shown) are stored in memory resulting in a three-dimensional array 35 (herein also referred to as a "data cube" or simply "cube") of samples 36. The array 35 may have, for example, 512 samples along a range dimension, 64 samples along a Doppler or pulse dimension and 8 samples along a channel dimension.

In radar and other applications, a change of dimension requires re-ordering samples in memory (referred to as performing "corner turns"). A large amount of processing time can be spent on the corner turns.

Figure 12:
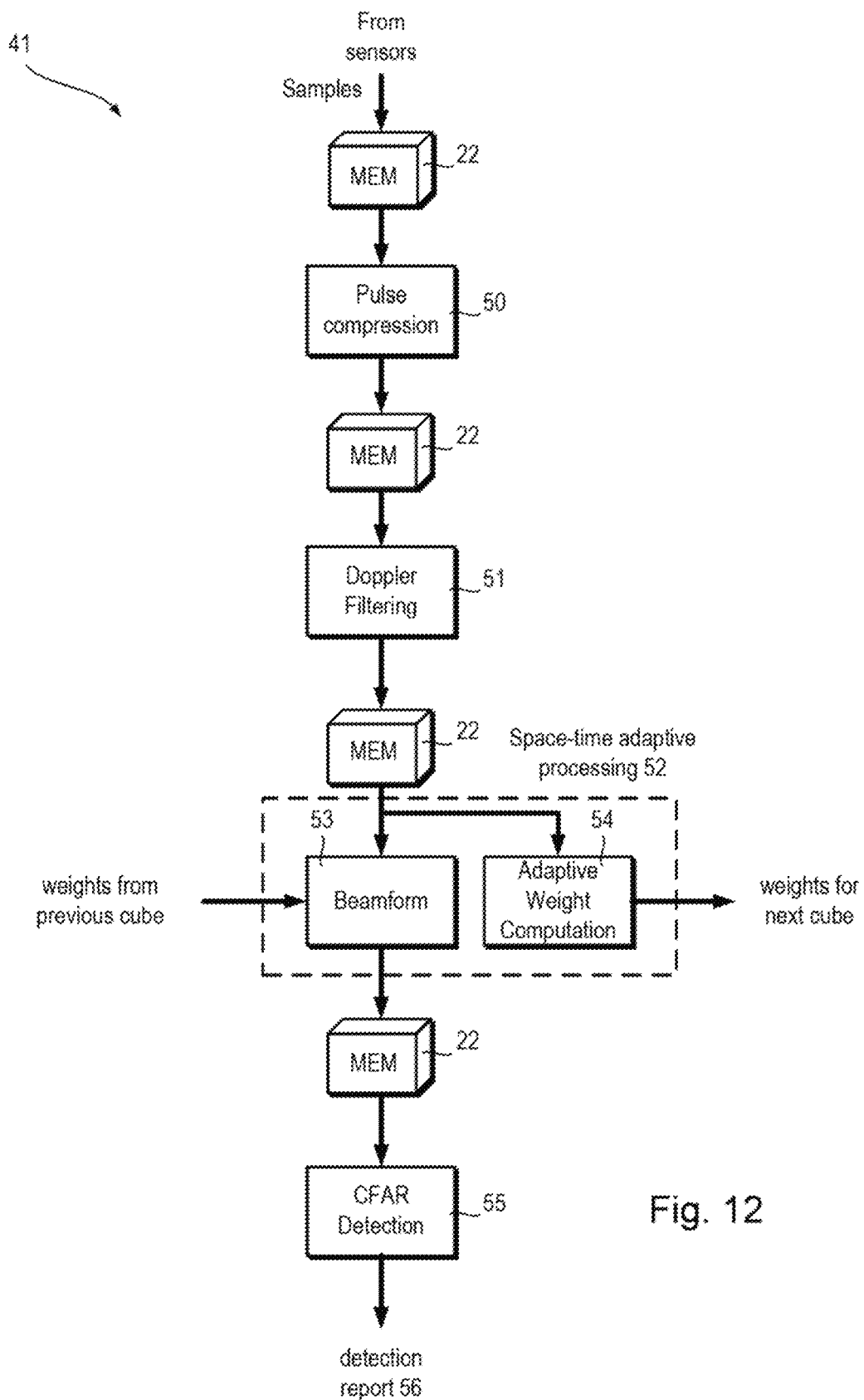
FIG. 12 is a schematic block diagram of a radar sample processing pipeline.

Referring to FIG. 12, the radar pulse processing system 41 can be implemented using a pipeline in which samples 36 are stored, as a data cube 35 (Figure ii), in memory $2_2$. Samples 36 are fed into a pulse compression block 50 and the output is stored in memory 22. Samples 36 are then read out and fed into a Doppler filtering block 51 and the output is stored in memory 22. The samples are read out and fed, together with weights from a previous data cube, into a space-time adaptive processing section 52 comprising a beamform block 53 and an adaptive weight computation block 54 which generates weights which are saved for the next cube, and are stored. The transformed samples 36 are read out and fed to a constant false alarm rate (CFAR) detection block 55 which outputs a detection report 56.

The multi-dimensional memory system 21 can be used to store and then read out the right concatenation of the samples 35 in the bus response for the given dimension. Thus, data reorganisation can be avoided.

Simple Examples Showing Address Calculation and Sample Storage Selection

Referring to FIG. 13A, a set of parameters 61 for the configuration register and global assignment of address and chip selects 62 for a simple example are shown in which the sample data width w_s is the same as the memory data width w_m.

The maximum number of samples per bus word k is four, the total number of dimensions d is three, the memory data width w_m is four bytes and the sample data width w_s is four bytes. There are four, five and two samples in first, second and third dimensions S_1, S_2, S_3, respectively.

As shown in FIG. 13A, values of dimension address A_1, A_2, A_3, sample address A_S, sample index I_S, physical word address A_P, sample storage chip select CS and address in memory A_M are tabulated.

Referring to FIG. 13B, contents of first, second, third and fourth sample storages $22_1$, $22_2$, $22_3$, $22_4$ are shown. Sample addresses in the array 35 are shown in round brackets and the sample indexes are shown in square brackets.

FIGS. 13C, 13D and 13E illustrate operation of the sample collector $29_1$, $29_2$, $29_3$, $29_4$ when accessing the sample storages $22_1$, $22_2$, $22_3$, $22_4$ along each of the three dimensions. FIGS. 13C, 13D and 13E show linear access address A_L, dimension address A_1, A_2, A_3, sample address A_S, sample index I_S, physical address A_P, sample storage chip select CS and memory address A_M accesses for each sample collector $29_1$, $29_2$, $29_3$, $29_4$.

FIG. 13C illustrates accessing the sample storages $22_1$, $22_2$, $22_3$, $22_4$ along the first dimension, i.e. range samples. In this case, no wait states are needed because only one dimensional address changes at a time.

FIG. 13D illustrates accessing the sample storages $22_1$, $22_2$, $22_3$, $22_4$ along the second dimension, i.e. pulse samples. In this case, no wait states are needed because, even though more than one dimensional address changes at a time, there are no CS conflicts.

FIG. 13E illustrates accessing the sample storages $22_1$, $22_2$, $22_3$, $22_4$ along the third dimension, i.e. channel samples. In this case, a wait state is needed.

Referring to FIG. 14A, a set of parameters 61 for the configuration register and global assignment of address and chip selects 62 for a simple example are shown in which the sample data width w_s is double the memory data width w_m.

FIG. 14B shows the contents of first, second, third and fourth sample storages $22_1$, $22_2$, $22_3$, $22_4$ and FIGS. 14C, 14D and 14E illustrate operation of the sample collector $29_1$, $29_2$, $29_3$, $29_4$ when accessing the sample storages $22_1$, $22_2$, $22_3$, $22_4$ along each of the three dimensions.

Bus Address Decoding Scheme for Radar Devices

Referring again to FIG. 6A, the address calculators $28_1$, ... $28_k$ employ an address decoding scheme to generate dimensional address A_1, ..., A_d from bus address A_B.

An address decoding scheme will now be described with reference to FIG. 15.

Figure 15:
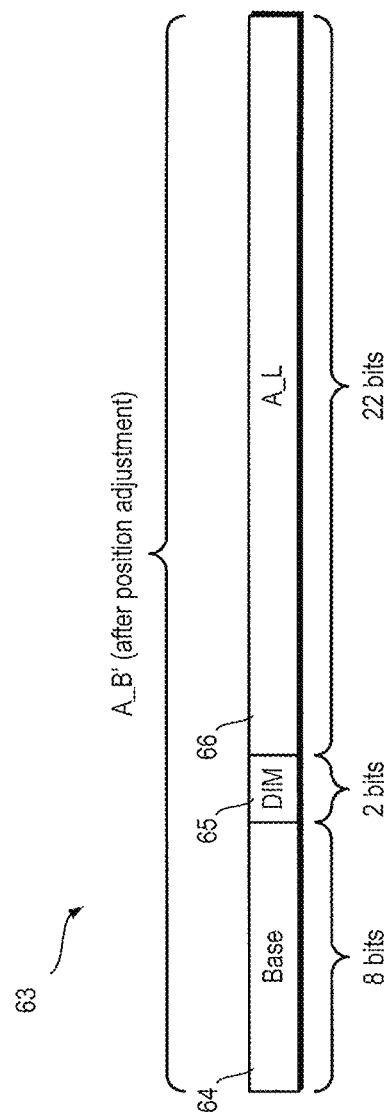
FIG. 15 shows a bus address.

FIG. 15 shows a bus address A_B' 63 (i.e. the bus address A_B after position adjustment for a given sample) comprising a base field 64, a dimension access mode (DIM) field 65 and a linear address A_L 66. As fixed parameters, the memory data width w_m is four bytes and the number of dimensions is three.

Range Addressing Mode

Range addressing mode can be selected by setting DIM to 0, i.e. 2b00. The first, second and third dimensional addresses A_1, A_2 and A_3 are calculated as follows:

$$A\_1 = (A\_L/(w\_s))\ \%\ S\_1 \quad (6\text{-R-}1)$$

$$A\_2 = (A\_L/(S\_1 * w\_s))\%\ S\_2 \quad (6\text{-R-}2)$$

$$A\_3 = (A\_L/(S\_2 * S\_1 * w\_s))\%\ S\_3 \quad (6\text{-R-}3)$$

Range addressing mode can also be used to access the memory in a traditional way by setting the sample width to be the same as memory width, i.e., w_s=w_m, and the dimension size S_1, ..., S_d to be the maximum physical memory size.

Pulse Addressing Mode

Pulse addressing mode can be selected by setting DIM to 1, i.e. 2b01. The first, second and third dimensional addresses A_1, A_2 and A_3 are calculated as follows:

$$A\_1 = (A\_L/(S\_2 * w\_s))\ \%\ S\_1 \quad (6\text{-P-}1)$$

$$A\_2 = (A\_L/(w\_s))\%\ S\_2 \quad (6\text{-P-}2)$$

$$A\_3 = (A\_L/(S\_2 * S\_1 * w\_s))\ \%\ S\_3 \quad (6\text{-P-}3)$$

Channel Addressing Mode

Channel addressing mode can be selected by setting DIM to 2, i.e. 2b10. The first, second and third dimensional addresses A_1, A_2 and A_3 are calculated as follows:

$$A\_1 = (A\_L/(S\_3 * w\_s))\ \%\ S\_1 \quad (6\text{-C-}1)$$

$$A\_2 = (A\_L/(S\_3 * S\_1 * w\_s))\%\ S\_2 \quad (6\text{-C-}2)$$

$$A\_3 = (A\_L/(w\_s))\%\ S\_3 \quad (6\text{-C-}3)$$

Sample Index

The sample index I_S is calculated using:

$$I\_S = A\_L/w\_m\ \%\ (w\_s/w\_m) \quad (7)$$

FIGS. 16 to 21 show examples of dimensional addresses A_1, A_2 and A_3 and physical address A_P calculated using equations 2, 3, 6-R-1, 6-R-2, 6-R-3, 6-P-1, 6-P-2, 6-P-3, 6-C-1, 6-C-2, 6-C-3 and 7.

Referring to FIGS. 16 and 17, dimensional addresses A_1, A_2 and A_3 are shown for a range address map calculated using equations 6-R-1, 6-R-2, 6-R-3 when S_1=4, S_2=2, S_3=3.

Referring to FIGS. 18 and 19, values of dimensional addresses A_1, A_2 and A_3 are shown for a pulse address map calculated using equations 6-P-1, 6-P-2, 6-P-3 when S_1=4, S_2=2, S_3=3.

Referring to FIGS. 20 and 21, values of dimensional addresses A_1, A_2 and A_3 are shown for a channel address map calculated using equations 6-C-1, 6-C-2, 6-C-3 when S_1=4, S_2=2, S_3=3

Memory System 71

Referring to FIG. 6A, the memory system 21 includes an interface with only one bus. However, memory 22 can be accessed by m buses (where m is a positive integer greater than one) by providing a ready (RDY) feedback from the sample storage to the sample collector. For example, there may be sufficient samples in memory to require a plurality of digital signal processors (DSPs) to process the samples. Memory may be divided into a plurality of portions, with each DSP processing a respective portion of memory. Each DSP uses a respective bus to access the memory. This allows the DSPs to process data in parallel. For example, eight DSPs can be used, thereby requiring eight buses (i.e. m=8). Each bus is provided with a bus master (not shown).

A RDY feedback can also be used to handle conflicts in CS selection. If a plurality of sample collectors accesses the same sample storage, then conflict can be resolved by an arbiter.

To support m bus interfaces, there are an equivalent number of memory segments. In the best case, m masters can access each segment without conflicts.

Figure 22A:
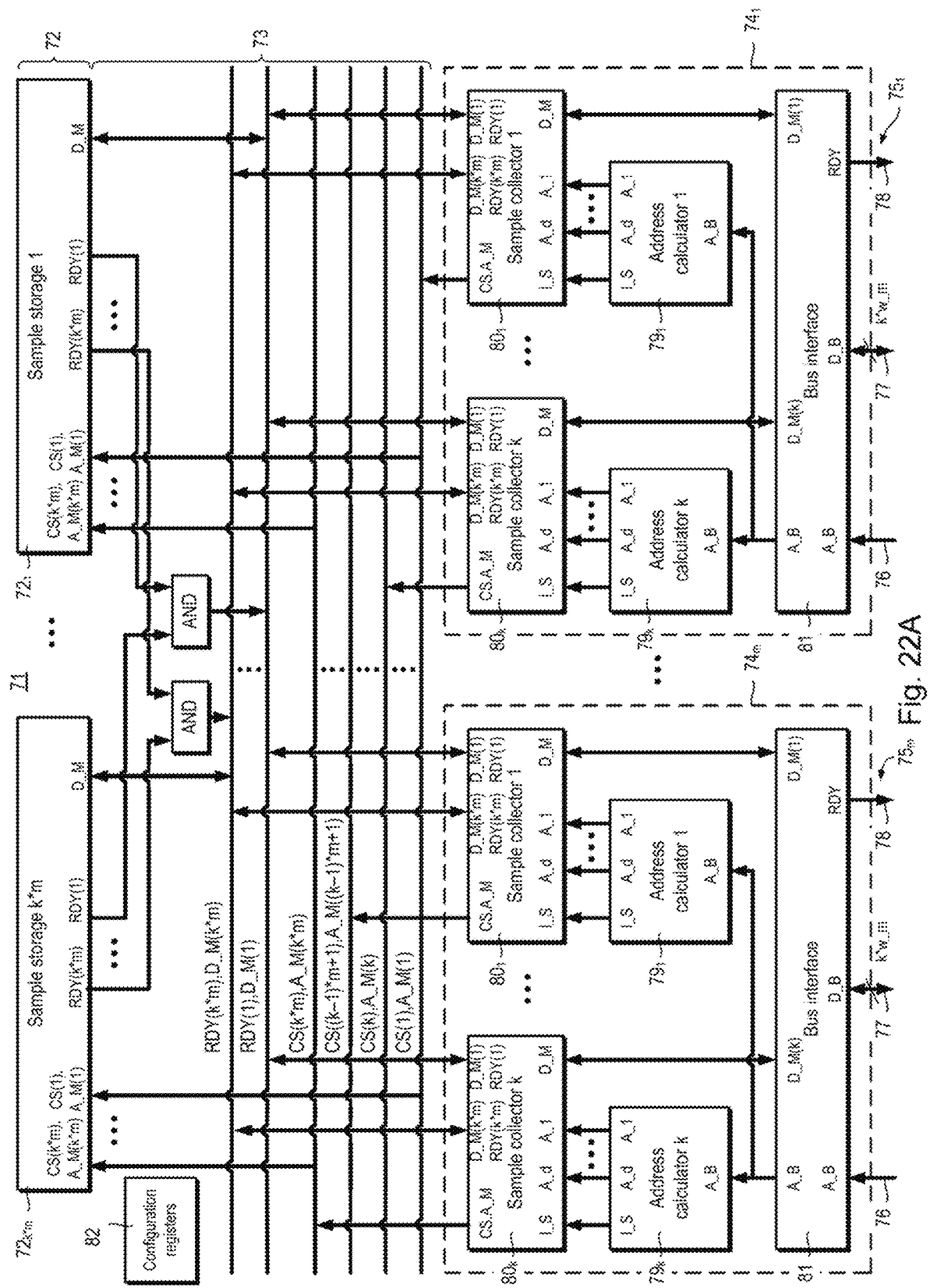
FIG. 22A is schematic block diagram of a memory system which includes memory and an array of memory access units in accordance with the present invention.

Referring to FIG. 22A, the memory system 71 includes memory 72 in the form of an array of (k*m) sample storage modules $72_1, \ldots, 72_{k*m}$ (where k is an integer greater than two). The memory system 71 includes bus wiring 73 and m memory access units $74_1, \ldots, 74_m$ interconnecting the memory 72 and m buses $75_1, \ldots, 75_m$ each of which consists of an address bus 76, a data bus 77 and RDY signal 78.

Each memory access unit $74_1, \ldots, 74_m$ includes an array of k address calculator modules $79_1, \ldots, 79_k$, an array of k sample collector modules $80_1, \ldots, 80_k$ and a common bus interface 81. The memory system 71 is provided with a set of configuration registers 82.

Each memory module $72_1, \ldots, 72_m$ has a memory data width w_m. In this example, memory data width w_m is 32 bits and each data bus 77 is 128 bits wide.

Figure 22B:
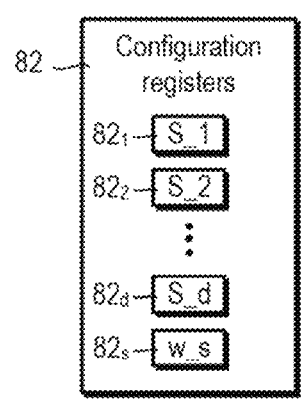
FIG. 22B illustrates a configuration register.

Referring also to FIG. 22B, the configuration registers 82 include a set of registers $82_1, 82_2, \ldots, 81_d$ (where d is a positive integer more than one) specifying the number of samples S_1 where i={1, 2, . . . , d} and a register $82_s$ specifying sample data width w_s. The sample data width w_s equals or is an integer multiple of memory data width w_m. The configuration registers 82 are set by a user before the memory system 71 is used.

Figure 23:
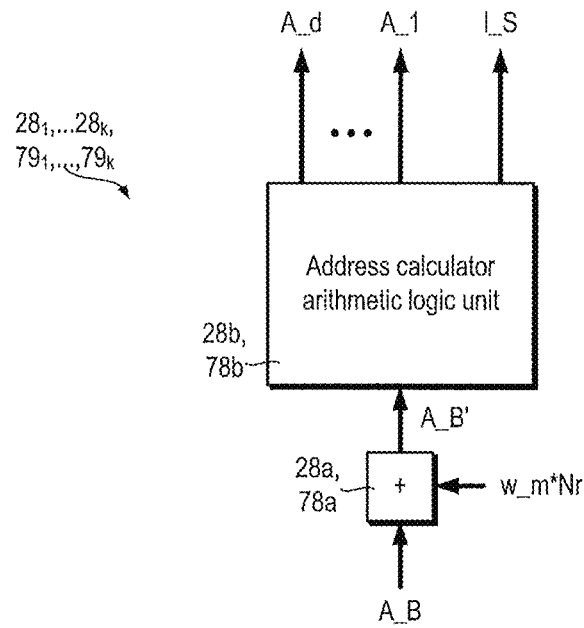
FIG. 23 is a schematic block diagram of an address calculator.

Referring to FIG. 23, an address calculator $28_1, \ldots 28_k$, $79_1, \ldots, 79_k$ is shown in more detail.

The address calculator $28_1, \ldots 28_k, 79_1, \ldots, 79_k$ comprises an adder unit 28a, 79a and address calculator arithmetic logic unit 28b, 79b.

The adder unit 28a, 79a adjusts the bus address A_B to match the position Nr=1, 2, . . . , k of the sample in the bus data word using equation (i) above.

The address calculator arithmetic logic unit 28b, 79b converts the sample bus address A_B' into the dimensional address A_1, . . . , A_d and the sample index I_S. Different address decoding schemes are possible.

Figure 24:
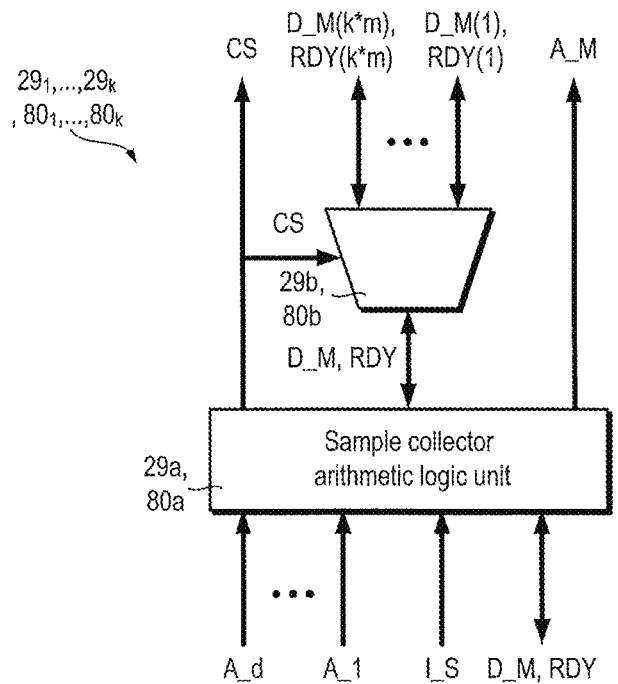
FIG. 24 is a schematic block diagram of a sample collector.

Referring to FIG. 24, a sample collector $29_1, \ldots, 29_k$, $80_1, \ldots, 80_k$ is shown in more detail.

The sample collector $29_1, \ldots, 29_k, 80_1, \ldots, 80_k$ comprises sample calculator arithmetic logic unit $29_a$, 80a and a multiplexer $29_b$, 80b.

To support parallel accesses without conflicts from m bus interfaces, the sample storage chip select signal CS partitions memory into m segments, where m is a positive integer greater than one. Each segment contains S_M words.

Within the segment, sample collector $29_1, \ldots, 29_k$, $80_1, \ldots, 80_k$ calculates sample storage chip select signal CS(MULTIPLE BUS) (hereinafter also referred to simply as CS) using:

$$CS(MULTIPLE\ BUS) = (A\_P/S\_M)*k + CS(SINGLE\ BUS) \quad (4')$$

where CS(SINGLE) can be calculated using equation 4 above.

The sample collector $29_1, \ldots, 29_k, 80_1, \ldots, 80_k$ calculates address in memory A_M using equation 4' below:

$$A\_M = (A\_P\ \%\ S\_M)/k \quad (5')$$

D_B is bi-directional depending on transfer direction (read/write).

RDY indicates that a bus must wait where there are multiple masters and/or multiple sample collectors access the same RAM module.

Figure 25:
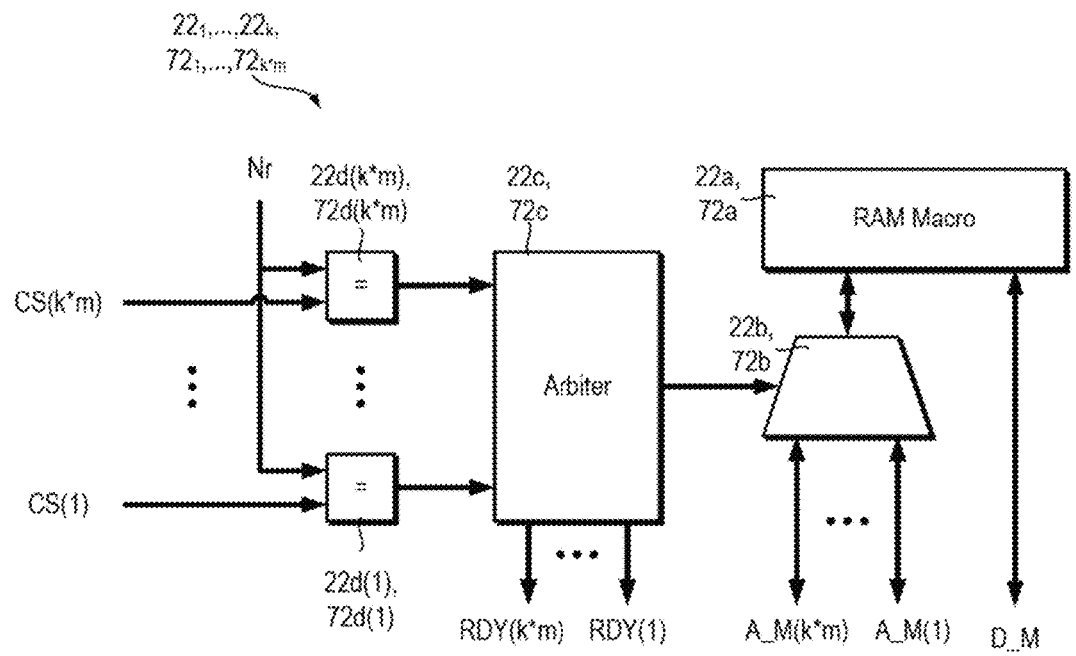
FIG. 25 is a schematic block diagram of a sample storage module.

Referring to FIG. 25, a sample storage module $22_1, \ldots, 22_{k*m}, 72_1, \ldots, 72_{k*m}$ is shown in more detail.

The sample storage module $22_1, \ldots, 22_{k*m}, 72_1, \ldots, 72_{k*m}$ comprises a RAM macro 22a, 72a, a multiplexer 22b, 72b, an arbiter 22c, 72c and comparators 22d(1), . . . , 22d(k*m), 72d(1), . . . , 72d(k*m).

Each sample storage $72_1, \ldots, 72_{k*m}$ reacts only to a CS request that matches its number Nr, where Nr={1, . . . , k*m}. The arbiter 22C, 72C selects one request from all active CS requests by a suitable policy, for example round-robin. All other sample collectors $29_1, \ldots, 29_k, 80_1, \ldots, 80_k$ are paused using the RDY signal.

RAM 22a, 72a handles the data word transfer depending on the direction (read or write).

Figure 26:
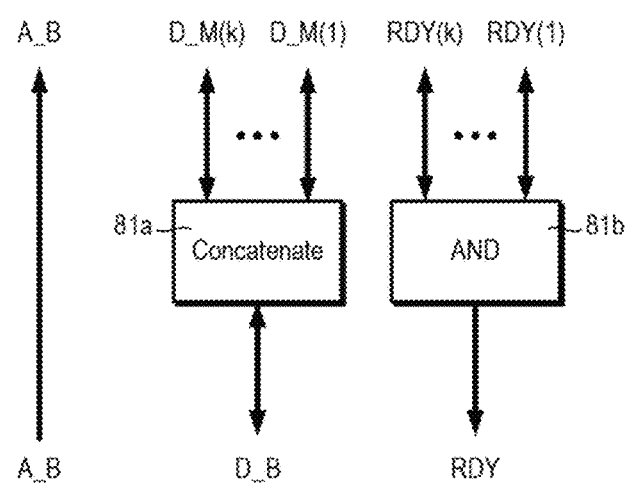
FIG. 26 is a schematic block diagram of a bus interface.

Referring to FIG. 26, a bus interface 81 is shown in more detail.

The bus interface 81 includes a concatenate block 81a and k-input AND gate 81b.

Each sample collector $80_1, \ldots, 80_k$ handles a fixed sample position in the bus word. The bus interface 81 concatenates data D_M from each sample collector $80_1, \ldots, 80_k$ for output as bus data, namely:

$$D\_B = \{D\_M(k), \ldots, D\_M(1)\} \quad (7)$$

The k-input AND gate 81b receives RDY(1), . . . , RDY(k) from the sample collectors $80_1, \ldots, 80_k$ and outputs a RDY signal.

Figure 27:
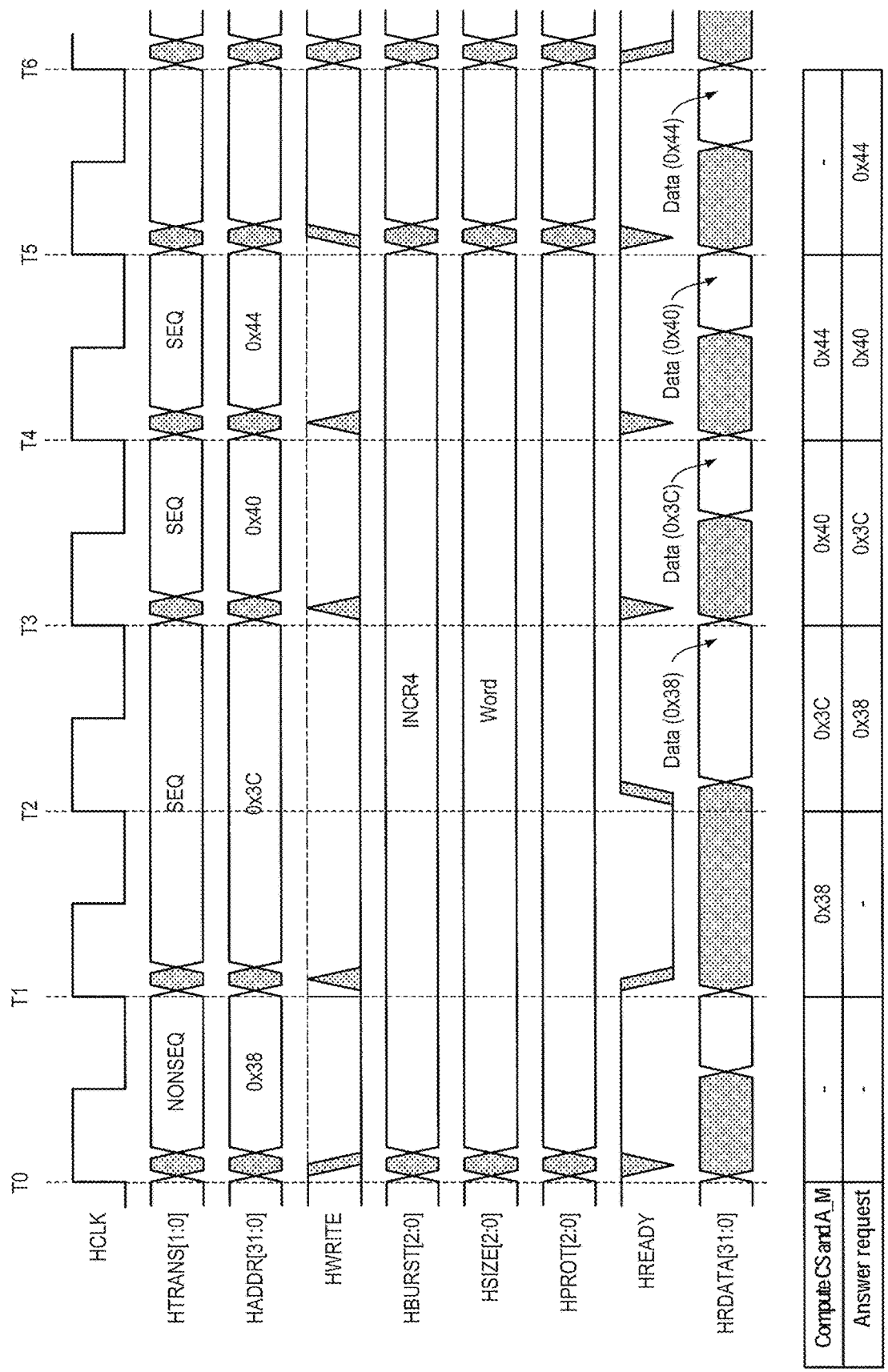
FIG. 27 is a bus timing diagram.

Referring to FIG. 27, when address calculations are timing-critical, they can be pipelined provided burst-property is maintained.

FIG. 27 shows halting an Advanced High-performance Bus (AHB) only for one cycle at the beginning of a burst to compute CS and A_M.

Figure 28:
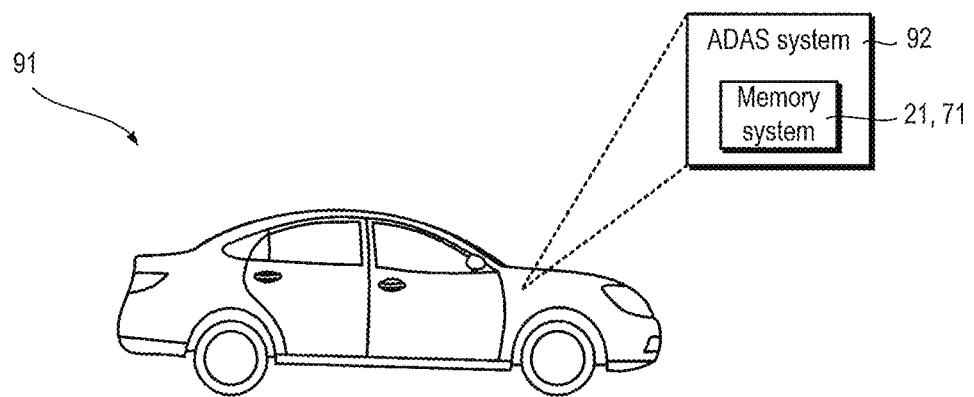
FIG. 28 illustrates a motor vehicle comprising a memory system.

Referring to FIG. 28, a motor vehicle 91 is shown.

The motor vehicle 91 includes an advanced driver assistance system (ADAS) 92 which includes sensors (not shown) and one or more memory systems 21, 71.

It will be appreciated that many modifications may be made to the embodiments hereinbefore described.

The invention claimed is:

1. A memory access unit for handling transfer of a sample in a d-dimensional array between one of m data buses, where m≥1, and k*m memories, where k≥2, the memory access unit comprising:
   k address calculators, each address calculator configured to receive a bus address, to add a respective offset to generate a sample bus address and to generate, from the sample bus address according to an addressing scheme, a respective address in each of the d dimensions for accessing the sample; and
   k sample collectors, each sample collector operable to generate a memory select for a respective one of the k*m memories so as to transfer the sample between a predetermined position in a bus data word and the respective one of the k*m memories,
   wherein each sample collector is configured to calculate a respective memory select in dependence upon the address in each of the d dimensions such that each sample collector selects a different one of the k*m memories so as to allow the sample collectors to access k of the k*m memories concurrently.

2. A memory access unit according to claim 1, further comprising: a set of registers for changeably setting the number of samples in each of the d dimensions and/or sample data width.

3. A memory access unit according to claim 1, wherein the number of dimensions d is settable to be two or three.

4. A memory access unit according to claim 1, wherein each sample collector is configured to calculate a respective memory select in dependence upon a sum of addresses in each of the d dimensions.

5. A memory access unit according to claim 1, wherein each address calculator is configured to generate an index, wherein each sample collector is configured to calculate a respective memory select in dependence upon the index.

6. A memory access unit according to claim 1, wherein each address calculator is configured to calculate a respective address in each of the d dimensions in dependence upon a linearly-increasing word address, sample data width and numbers of samples in each dimension.

7. A memory access unit according to claim 1, further comprising: a bus interface coupled to the address calculators and the sample collectors.

8. A memory access unit according to claim 1, implemented in hardware logic.

9. A memory controller comprising:
at least one memory access unit according to claim 1.

10. A memory controller according to claim 9, wherein the memory controller comprises: m memory access units for handling transfers of samples between the m data buses and the k*m memories.

11. A memory system comprising:
a memory controller according to claim 10; and
a plurality of sets of k*m memories operatively connected to respective ones of m memory access units by bus wiring.

12. An integrated circuit comprising:
a memory access unit according to claim 1.

13. An integrated circuit according to claim 12, which is a microcontroller.

14. A motor vehicle comprising:
a computing device comprising a memory access unit according to claim 1.

15. A method of transferring a sample in a d-dimensional array between one of m data buses, where $m \geq 1$, and k*m memories, where $k \geq 2$, the method comprising:
for each of k samples:
receiving a bus address and adding a respective offset to generate a sample bus address;
generating, from the sample bus address according to an addressing scheme, a respective address in each of the d dimensions for accessing samples along one of the d dimensions; and
generating a memory select for a respective one of the k*m memories so as to transfer the sample between a predetermined position in a bus data word and the respective one of the k*m memories, wherein generating the memory select comprises calculating a respective memory select in dependence upon the addresses in each of the d dimensions,
so as to allow k samples to be written to or read from k of the k*m memories concurrently.

16. An integrated circuit comprising:
a memory controller according to claim 9.

17. An integrated circuit according to claim 16, which is a microcontroller.

18. A motor vehicle comprising:
a computing device comprising a memory controller according to claim 9.

* * * * *